(12) United States Patent
Shirai et al.

(10) Patent No.: US 7,443,342 B2
(45) Date of Patent: Oct. 28, 2008

(54) RECEPTION TIME DETERMINING APPARATUS AND DISTANCE MEASURING APPARATUS USING THE SAME

(75) Inventors: Toshihito Shirai, Kuki (JP); Takaharu Ishige, Kuki (JP); Masayoshi Sakai, Kuki (JP); Wakana Sannomiya, Kuki (JP)

(73) Assignee: The Nippon Signal Co., Ltd., Tokyo (JP)

( * ) Notice: Subject to any disclaimer, the term of this patent is extended or adjusted under 35 U.S.C. 154(b) by 207 days.

(21) Appl. No.: 11/485,321

(22) Filed: Jul. 13, 2006

(65) Prior Publication Data
US 2007/0002932 A1     Jan. 4, 2007

Related U.S. Application Data

(63) Continuation of application No. PCT/JP2004/010129, filed on Jul. 15, 2004.

(30) Foreign Application Priority Data
Jan. 13, 2004     (JP) .............................. 2004-005326

(51) Int. Cl.
  *G01S 1/24*     (2006.01)
  *G01S 3/02*     (2006.01)
(52) U.S. Cl. ...................................... 342/387; 342/458
(58) Field of Classification Search ................ 342/134, 342/118, 458, 387–389
See application file for complete search history.

(56) References Cited

U.S. PATENT DOCUMENTS

| | | | |
|---|---|---|---|
| 4,005,420 A | 1/1977 | McDonald | |
| 4,817,113 A | 3/1989 | Lundquist et al. | |
| 5,194,869 A | 3/1993 | Kochiyama et al. | |
| 5,657,021 A | 8/1997 | Ehsani-Nategh et al. | |
| 5,798,730 A * | 8/1998 | Sanchez | 342/195 |
| 6,239,741 B1 * | 5/2001 | Fontana et al. | 342/135 |
| 6,606,054 B2 * | 8/2003 | Okamura | 342/145 |
| 6,646,592 B2 * | 11/2003 | Matsuoka | 342/134 |

(Continued)

FOREIGN PATENT DOCUMENTS

EP     1134593     9/2001

(Continued)

*Primary Examiner*—Gregory C Issing
(74) *Attorney, Agent, or Firm*—McDermott Will & Emery LLP

(57) ABSTRACT

The invention provides a reception time determining apparatus which can measure reception time to a high accuracy, without expanding an occupied bandwidth, and a distance measuring apparatus which uses the reception time determining apparatus.

There is provided a reception time determining apparatus (11, 111) where a transmitter (1, 100) sends a transmission signal which produces a demodulation signal in which a signal change portion is unevenly distributed on a time axis, and there is provided: a demodulation section (12, 112) which receives and demodulates this transmission signal and outputs a demodulation signal in which a signal change portion is unevenly distributed on a time axis; a signal change portion detection section (13, 113) which detects the signal change portion of the demodulation signal which is output from the demodulation section (12, 112), and outputs a signal change portion detection signal; and a time measurement section (14, 114) which measures a reception time of the reception signal based on the signal change portion detection signal output from the signal change portion detection section (13, 113).

10 Claims, 24 Drawing Sheets

U.S. PATENT DOCUMENTS

| | | | |
|---|---|---|---|
| 6,989,782 B2 * | 1/2006 | Walker et al. | 342/134 |
| 2002/0186162 A1 | 12/2002 | Okamura | |
| 2003/0035342 A1 * | 2/2003 | Harrington et al. | 367/127 |

FOREIGN PATENT DOCUMENTS

| | | |
|---|---|---|
| GB | 1212265 | 11/1970 |
| JP | 05-027018 | 2/1993 |
| JP | 5-34439 | 2/1993 |
| JP | 07-234272 | 9/1995 |
| JP | 08-070330 | 3/1996 |
| JP | 09-197035 | 7/1997 |
| JP | 11-066044 | 3/1999 |
| JP | 2001-036943 | 2/2001 |
| JP | 2001-249175 | 9/2001 |
| JP | 2002-365362 | 12/2002 |
| JP | 2003-302463 | 10/2003 |

* cited by examiner

FIG.6
(A)
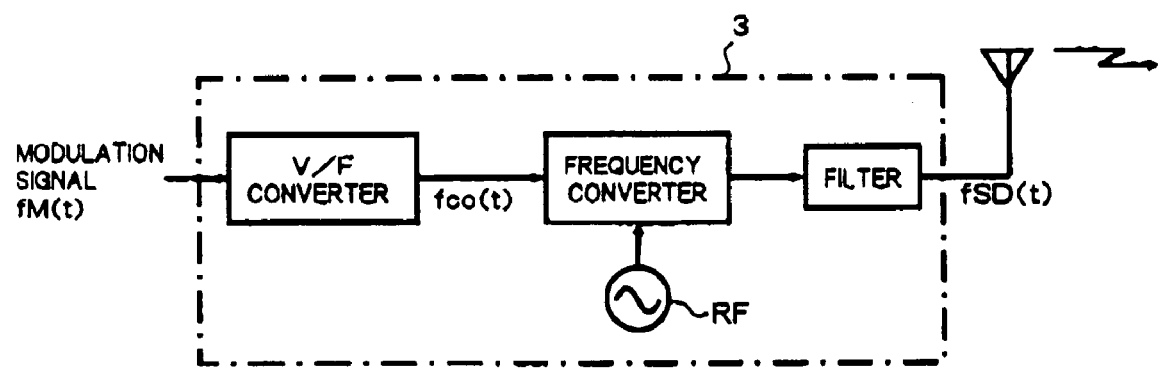
(B)
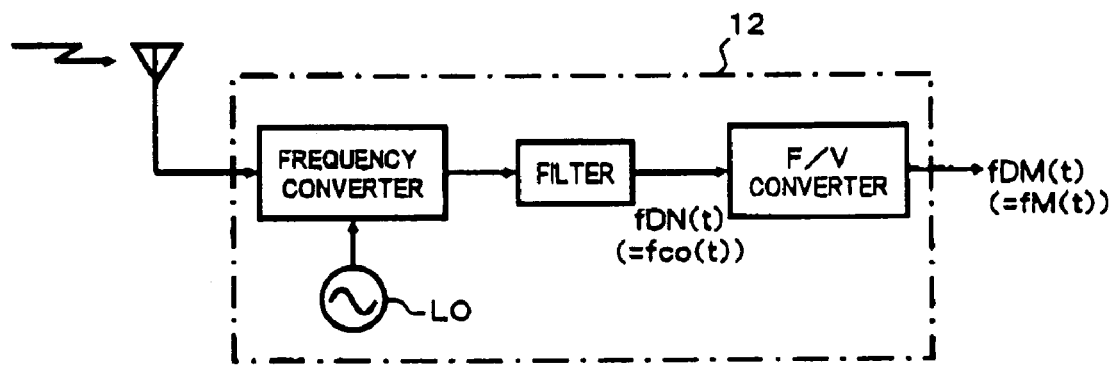

FIG.7
(A)
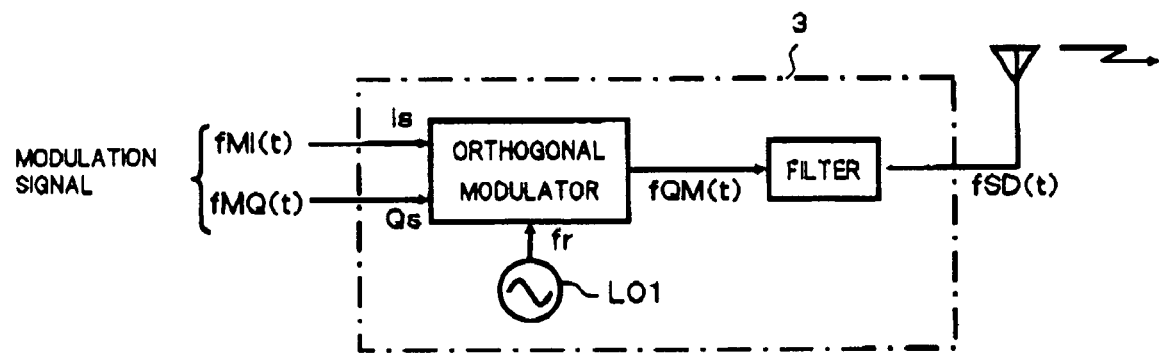
(B)
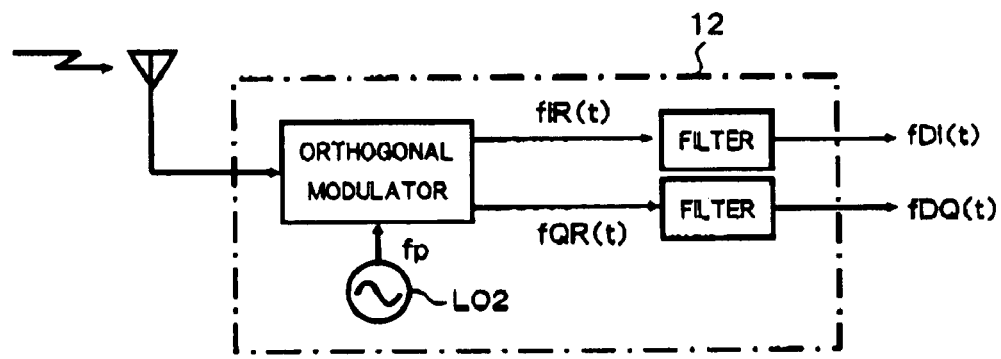

FIG. 24

| V. M. | DISCONTINUITY (0-TH ORDER DIFFERENTIAL DISCONTINUITY) | 1st ORDER DIFFERENTIAL DISCONTINUITY | 2nd ORDER DIFFERENTIAL DISCONTINUITY | 3rd ORDER DIFFERENTIAL DISCONTINUITY |
|---|---|---|---|---|
| 1 | ○ | × | × | × |
| 2 | ○ | ○ | × | × |
| 3 | ○ | ○ | ○ | × |
| 4 | ○ | ○ | ○ | ○ |

RECEPTION TIME DETERMINING APPARATUS AND DISTANCE MEASURING APPARATUS USING THE SAME

This application is a continuation of International Application No. PCT/JP2004/010129, with an international filing date of Jul. 15, 2004.

TECHNICAL FIELD

The present invention relates to a reception time determining apparatus for measuring the reception time of a transmission signal, and in particular to a reception time determining apparatus which can measure the reception time at high accuracy without increasing an occupied band width. Furthermore, the invention relates to a distance measuring apparatus which uses this reception time determining apparatus.

BACKGROUND ART

In a distance measuring apparatus which measures a propagation time for a radio wave from a transmitter to a receiver, and calculates the distance, it is necessary to measure the reception time of the radio wave in the receiver.

As a method of measuring the reception time of the radio wave, heretofore there is a method of measuring the reception time using a spread spectrum communication (for example refer to Marubayashi et. al. "Spread Spectrum Communication and its Application", The Institute of Electronics, Information and Communication Engineers"). Hereunder is a brief description of the case of using a direct diffusion process using a PN code.

The transmitter diffusion processes the data signal using the PN code, and generates a diffusion signal of a baseband frequency band, and modulates this signal and transmits it as a radio signal of an RF (radio frequency) band. The receiver demodulates the received radio signal to a demodulation signal of the baseband frequency band, and inverse diffusion processes the demodulation signal with a matched filter using the PN code. The inverse diffusion output which is output from the matched filter shows a maximum value when the demodulation signal is in the same phase as the PN code of the matched filter, and if the phase is displaced by one chip or more of the PN code this becomes approximately zero giving a triangular waveform shape. For example the generation time of the maximum value of the triangular wave is measured and made the reception time.

Furthermore, there is a device which obtains the reception time difference of the radio wave, and measures the distance (for example Japanese Unexamined Patent Publication No. 2001-36943).

This receives the carrier wave transmitted from the vehicle side with an on route radio, and modulates the carrier wave received by the radio, based on the spread spectrum code, and replies to the vehicle side. On the vehicle side, the modulated wave from the on route radio is respectively received by the plurality of receivers, and the carrier wave component is removed from the received modulated wave using a band pass filter, and the frequency components of the spread-spectrum codes are respectively extracted, and the extracted spread-spectrum codes are demodulated to obtain the phase difference (equivalent to the reception time difference), and from this phase difference, the difference between the receivers of the vehicle and the on route radio is calculated to thereby specify the vehicle position.

DISCLOSURE OF THE INVENTION

[Problems that the Invention is to Solve]

However, the accuracy of the distance measurement depends on the accuracy of the time measurement. In the case of the former reception time measurement method, the time measurement accuracy depends on the detection accuracy for the maximum value of the triangular wave obtained as the inverse diffusion output, so that the sharper triangular wave, the more the measurement accuracy is improved. Consequently, to improve the measurement accuracy, the chip rate (frequency) of the PN code should be high. However since the occupied bandwidth of the transmitted radio signal is normally controlled by the radio wave method or the like, there is an upper limit to the chip rate which can be used, so there is a problem in that it is difficult to increase the measurement accuracy above this upper limit.

Furthermore, in the case of the latter (Japanese Unexamined Patent Publication No. 2001-36943), the distance measurement accuracy depends on the measurement accuracy of the phase difference (time difference) of the respective spread-spectrum codes. Here, the band pass filter of Japanese Unexamined Patent Publication No. 2001-36943 is set to only remove the carrier wave component, and to pass practically all of the frequency component of the main lobe of the spread-spectrum code. Therefore, the waveform of the filter output signal is determined by the main lobe component of the generally spread-spectrum code. Hence the measurement accuracy of the phase difference of the demodulated spread-spectrum code depends on the fundamental frequency of the diffusion code, that is on the chip rate of the diffusion code, so that there is the same problem as for the former case.

As a separate reception time measurement method, there is a method which uses wavelet transformation (refer for example to Japanese Unexamined Patent Publication No. H8-70330). In this method, wavelet transformation is used to extract the timing information of the reception signal. More specifically, the time position of a signal level discontinuity of the demodulation signal is detected. In the receiver, the demodulation signal which depends on the discontinuity of the signal level, is input to an orthogonal wavelet transform unit which carries out wavelet transformation. Generally, since the discontinuity of the signal level contains high frequencies, the target high frequency signal is filtered in the orthogonal wavelet transform unit, and extracted, and the time position of the discontinuity is detected from the output of the orthogonal wavelet transform unit.

In this method, the level discontinuity of the demodulation signal is the detection target, and highly accurate reception time measurement can be realized, so that there is the situation where the level discontinuity depends on the demodulation signal. However, since the level discontinuity contains high frequencies as mentioned above, then in the case of wireless communication, expansion of the demodulation signal, or the occupied bandwidth of the radio signal is caused, so that there is a problem from the viewpoint of utilization efficiency of frequency resources. If the occupied bandwidth is kept within the limit, then on the transmission side, the transmission rate (information transmission speed) of binary data signals must be lowered. Therefore, in the wireless transmission normally on the transmission side, the discontinuous data signal of the signal level is made a smooth signal where the high frequency components are cut by means of a low pass filter and a level discontinuity does not occur. This modulate and transmit a carrier wave as a modulation signal, so that the information transmission speed which is suppressed by the occupied bandwidth is not reduced. In this case, since a level discontinuity does not exist in the demodulation signal generated by the demodulation process of the receiver, then the latter measurement method cannot be adopted. If the time can be detected at a high accuracy using a signal where the signal level is continuous, then this can be completed without expanding the occupied bandwidth of the wireless signal. Furthermore, this can be completed without sacrificing the information transmission seed etc., so that its usefulness for industry is high. However, up to now a device which can detect time at high accuracy using a signal for which the signal level is continuous, has not been proposed.

The present invention addresses the above problems, with an object of providing a reception time determining apparatus which can measure the reception time to a high accuracy using a signal change portion which contains a high frequency component. Furthermore it is an object to provide a distance measuring apparatus which uses the reception time determining apparatus.

[Means to Solve the Problem]

Therefore, according to a first aspect of the present invention, in a reception time determining apparatus which measures the reception time of a transmission signal from a transmitter, wherein the transmission signal is a signal which produces a demodulation signal in which a signal change portion is unevenly distributed on a time axis, the apparatus comprises: a demodulation section which demodulates a reception signal and outputs the demodulation signal; a signal change portion detection section which detects the signal change portion contained in the demodulation signal which is output from the demodulation section, and outputs a signal change portion detection signal; and a first time measurement section which measures a reception time of the reception signal based on the signal change portion detection signal output from the signal change portion detection section.

With such a construction, from the transmitter is transmitted a signal which produces a demodulation signal in which the signal change portion is unevenly distributed on a time axis. The demodulation section demodulates the reception signal and outputs a demodulation signal where the signal change portion is unevenly distributed on the time axis. The signal change portion detection section detects the signal change portion contained in the demodulation signal, and outputs a signal change portion detection signal. The first time measurement section measures the reception time of the reception signal based on the input signal change portion detection signal, and reports this.

The demodulation signal, as in a second aspect of the invention, is a signal where the waveform is continuous on a time axis.

In this second aspect of the invention, as in a third aspect, the signal change portion is a portion in which at least one of; a voltage level, a frequency, and a phase, of the demodulation signal changes on the time axis. Moreover, the signal change portion detection section is constituted by a band pass filter which passes frequency components containing the signal change portion, and the first time measurement section measures a reception time based on an output signal of the band pass fitter.

In the band pass filter, as in a fourth aspect, the construction may be such that a pass band is set so as to pass the frequency component of at least one of the frequency components contained in the signal change portion, and an inhibition zone is set so as to inhibit frequency components constituting a main lobe of the demodulation signal.

With such a construction, the output signal from the band pass filter is such that the frequency component contained in the signal change portion becomes the main component, and the frequency component constituting the main lobe is attenuated. As a result, the waveform of the signal change portion in the output signal of the band pass filter is made more pointed, and the reception time detection accuracy is increased.

The band pass filter, as in a fifth aspect, may be constructed such that a low pass filter and a high pass filter are connected in cascade, and a cut off frequency of the low pass filter is made a high pass side cut off frequency of the band pass filter, and a cut off frequency of the high pass filter is made a low pass side cut off frequency of the band pass filter.

With such a construction, the linking produced in the output signal of the band pass filter can be converged in a short space of time, and hence position detection of the signal change portion is simplified, and reception time detection accuracy is further increased.

In the second aspect of the invention, as in a sixth aspect, the construction is such that the transmission signal is a signal which produces a demodulation signal for which a singularity exists locally in the signal change portion, and in which the signal level is continuous, and the signal change portion detection section is constructed with a singularity detection section which detects the singularity and outputs a singularity detection signal as the signal change portion detection signal, and the first time measurement section measures a reception time of the reception signal based on the singularity detection signal output from the singularity detection section.

With such a construction, a signal in which a singularity locally exists in the signal change portion, and which produces a demodulation signal in which the signal level is continuous, is transmitted from the transmitter. The singularity detection section detects a singularity contained in the demodulation signal output from the demodulation section, and outputs a singularity detection signal. The first time measurement section measures the reception time of the reception signal based on the input singularity detection signal, and reports this.

The singularity, as in a seventh aspect, may be a discontinuity appearing in an M-th order differential of a waveform of the demodulation signal. More specifically, as in an eighth aspect, the signal change portion of the demodulation signal is made by connecting a plurality of waveforms expressed by different continuous functions, and the discontinuity is produced in a node of a waveform in the signal change portion.

As in the ninth aspect, the singularity detection section may be constructed so as to generate the singularity detection signal by wavelet transformation using a wavelet which can detect a discontinuity appearing in an M-th order differential. Furthermore, as in a tenth aspect, the construction may be such that the singularity detection section generates the singularity detection signal by wavelet transformation using a wavelet having (M+1) or more vanishing moments.

In the configuration of the tenth aspect, as in an eleventh aspect, there is provided a noise component removal section comprising; a wavelet transform unit which performs wavelet transformation on input of the demodulation signal, and performs wavelet transformation using a wavelet having a vanishing moment of less than M, an inverse transform section which performs wavelet inverse transform on input of an output signal from the wavelet transform unit, and a subtraction which performs subtraction on an output signal from the inverse transform section and the demodulation signal, and an output signal from the subtractor is input to the singularity detection section.

A twelfth aspect of the invention is a distance measuring apparatus which measures a distance between a transmitter and a receiver, wherein the transmitter comprises a transmitter side timing section which are in synchronism with a receiver side timing section, and sends a transmission signal at a previously determined sending time, based on time information of the transmitter side timing section. The receiver comprises: a reception time determining apparatus as disclosed in the third aspect, the receiver side timing section, and a distance calculating section which calculates a distance between the transmitter and the receiver, from transmission time information obtained from timing information of the receiver side timing section, and a reception time measured by the reception time determining apparatus.

With such a construction, the distance between the transmitter and the receiver can be calculated with high accuracy.

A thirteenth aspect of the invention, is a distance measuring apparatus which measures a distance between a transmitter and a receiver, and the transmitter comprises a transmitter side timing section which are in synchronism with a receiver side timing section, and sends a transmission signal at a previously determined sending time, based on time information of the transmitter side timing section. The receiver comprises: a reception time determining apparatus as disclosed in the sixth aspect, the receiver side timing section, and a distance calculating section which calculates a distance between the transmitter and the receiver, from transmission time information obtained from timing information of the receiver side timing section, and a reception time measured by the reception time determining apparatus.

Furthermore, in the present invention, the construction may be such that there is provided an erroneous measurement prevention section which prevents erroneous measurement of the reception time due to noise existing in a demodulation signal.

With such a construction, a situation where the noise component is regarded to be the signal change portion, and is erroneously measured can be prevented.

The erroneous measurement prevention section, more specifically, is a correlation computing section which performs a correlation computation between a signal change portion detection signal and a previously determined correlation reference signal, and outputs a correlation signal which is a higher level the higher the similarity of the two signals. The construction may be such that the first time measurement section measures the reception time based on the correlation signal from the correlation computing section.

With such a construction, since similarity between noise and the correlation reference signal is made low, then if a noise is present, the correlation signal level becomes low, and the reception time is not measured.

Furthermore, if the construction is such that the demodulation section outputs two demodulation signals, namely a first and a second demodulation signal which are mutual orthogonal functions, the construction may be such that the signal change portion detection section has a first and second detection section, which respectively detect the signal change portions contained in the first and second demodulation signals, and output first and second signal change portion detection signals; and the first time measurement section comprises a square sum calculating section which outputs a square sum signal in which the respective square sum computation results of the first and second signal change portion detection signals respectively output from the first and second detection sections are added, and computes the reception time of the reception signal based on the square sum signal from the square sum calculating section.

With such a construction, the measurement processing of the reception time can be executed without considering the phase difference for when demodulating the reception signal from the square sum calculating section.

The construction may be such that, the first time measurement section is provided with a correlation computing section prior to the square sum calculating section, which has a first and a second computing section which respectively perform correlation computation on the first and second signal change portion detection signals with a previously determined correlation reference signal, and respectively output a first and a second correlation signal of a higher level the higher the similarity of the two signals, and measures the reception time of the reception signal using a square sum signal based on the first and second correlation signals output from the square sum calculating section. With such a construction, the influence of noise can also be removed.

The demodulation signal may be a code signal for a PN series. In this case, the construction may be such that there is provided an inverse diffusion processing section which performs inverse diffusion processing on the demodulation signal and outputs an inverse diffusion signal, and a second time computing section which computes a reception time of a reception signal based on an inverse diffusion signal from the inverse diffusion processing section.

With this construction, reception time measurement processing which uses a spectrum diffusion communication method which has an excellent noise proof property is possible.

Furthermore, the construction may be such that there is provided a measurement value determining section which previously determines an existence range for the reception time measured by the first time measurement section based on the reference reception time for where the reception time measured by the second time measurement section is made the reference reception time, and when a reception time measured by the first time measurement section is within the existence range, reports that the measurement time is normal, and when outside of the existence range, reports that the measurement time is abnormal.

With such a construction it is possible to detect a worsening of the accuracy of the reception time measured by the first time measurement section due to the influence of noise, based on the reference reception time which is hardly affected noise. Furthermore, a worsening of the accuracy of the reception time measured by the first time measurement section to worse than the measurement accuracy of the reference reception time can be prevented.

Moreover, the construction may be such that a signal change portion detection signal range or a demodulation signal range for performing timing calculation processing with the first time measurement section, are set based on the reference reception time with the reception time measured by the second time measurement section as a reference reception time, and only for the demodulation signal range or the signal change portion detection signal range, is the time measurement processing carried out by the first time measurement section.

With such a construction, the time measurement processing can be simplified.

[Effects of the Invention]

According to the reception time determining apparatus of the present invention as described above, this is constructed so that the reception time is measured using a high frequency component contained in the signal change portion, or a singularity component locally existing in the signal change portion. Therefore the reception time can be measured with high accuracy compared with heretofore, within the limitation of the occupied bandwidth of the wireless signal determined by the radio wave method. Consequently, this can be completed without expanding the occupied bandwidth of the wireless signal, and limited frequency resources can be effectively utilized. Furthermore, this can be completed without sacrificing information transmission speed in wireless communication.

Moreover, according to the distance measuring apparatus of the present invention, since the distance between the transmitter and the receiver is measured using the reception time determining apparatus of the present invention, the distance between the transmitter and the receiver can be measured with high accuracy.

BRIEF DESCRIPTION OF THE DRAWINGS

FIG. 6 shows a configuration example of a modulation section and a demodulation section, wherein (A) shows the modulation section, and (B) shows the demodulation section.

FIG. 7 shows another configuration example of a modulation section and a demodulation section, wherein (A) shows the modulation section and (B) shows the demodulation section.

FIG. 24 is a diagram showing a table showing a relationship between number of vanishing moments to detectable differential discontinuities.

BEST MODE FOR CARRYING OUT THE INVENTION

Hereunder is a description of embodiments of the present invention, based on the drawings.

At first is a description of a case of detecting a frequency component of a high frequency contained in a signal change portion of a demodulation signal, using a band pass filter, and then measuring the reception time.

Figure 1:
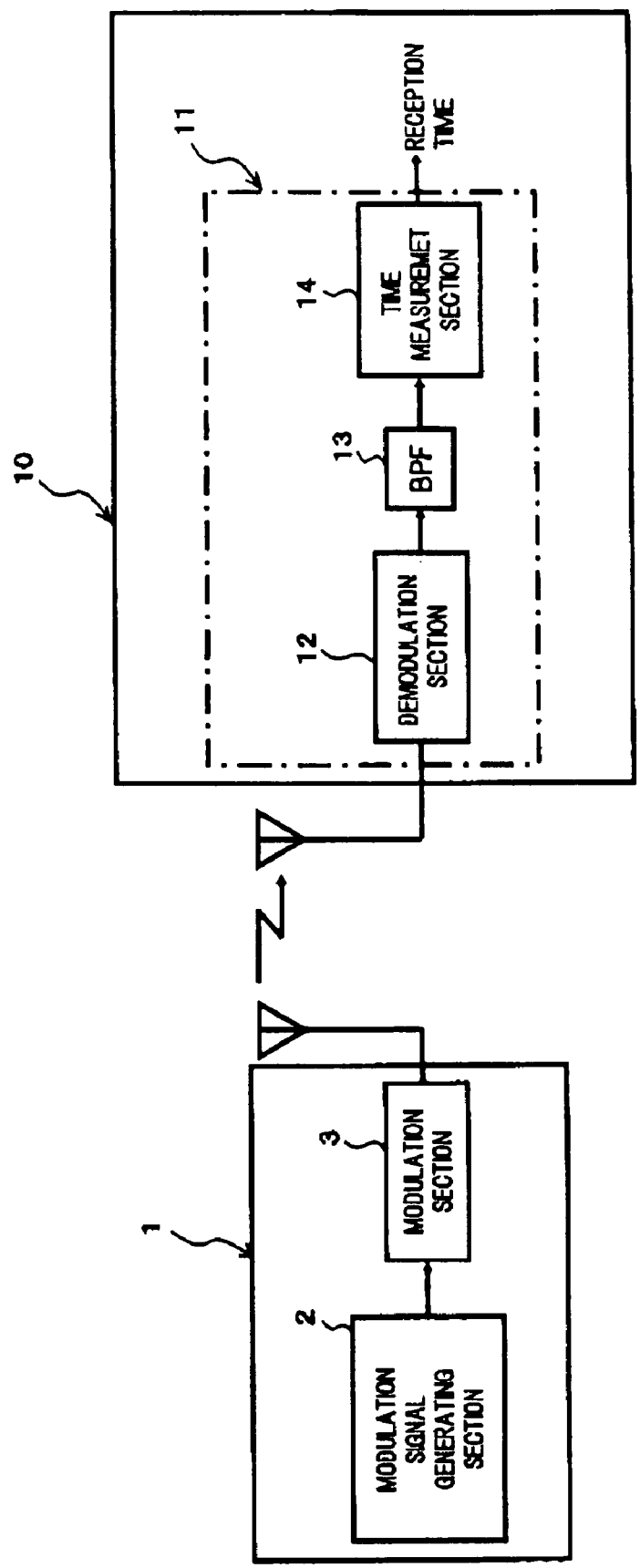
FIG. 1 is a block diagram showing a first embodiment of a reception time determining apparatus of the present invention.

FIG. 1 is a block diagram showing a configuration of a communication apparatus to which a first embodiment of a reception time determining apparatus according to the present invention is applied.

In FIG. 1, the communication apparatus comprises a transmitter 1 which sends a transmission signal, and a receiver 10 which receives the transmission signal from the transmitter 1. The receiver 10 comprises a reception time determining apparatus 11 which measures the reception time of a transmission signal.

The transmitter 1 is constructed to send a transmission signal, such that in the demodulation section 12 of the reception time determining apparatus 11, a demodulation signal in which a signal change portion is unevenly distributed on a time axis is periodically produced. For example this comprises a modulation signal generating section 2 which D/A converts digital waveform data of a demodulation signal using a D/A converter, and generates an analog modulation signal, and a modulation section 3 which modulates the analog modulation signal and outputs a radio signal in the RF band. This radio signal is transmitted from an antenna. Here uneven distribution of the signal change portion on the time axis means the signal change portion exists in an extremely narrow period in the demodulation signal. Furthermore, periodically includes a case where a demodulation signal in which the signal change portion is unevenly distributed, intermittently appears, or the case where a single set comprising a plurality of demodulation signals having patterns different from each other continuously appears. An amplifier may be provided after the modulation section 3, so that the radio signals are amplified and transmitted from an antenna.

The reception time determining apparatus 11 of the present invention comprises: a demodulation section 12 which modulates the transmission signal input via the antenna, and outputs a demodulation signal; a band pass filter 13 serving as a signal change portion detection section, which on input of the demodulation signal passes the frequency component of high frequency contained in the signal change portion which is unevenly distributed in the demodulation signal; and a time measurement section 14 serving as a first time measurement section, which on input of the output signal from the band pass filter 13, calculates the reception time of the reception signal and reports this. Here the output signal of the band pass filter 13 is the signal change portion detection signal. An amplifier may be provided before the demodulation section 12, so that the reception signal is input to the demodulation section 12 after being amplified.

The demodulation section 12 periodically outputs the demodulation signal in which the signal change portion is unevenly distributed on the time axis. Here the signal change portion is a portion in which at least one of the voltage level, the frequency, and the phase in the demodulation signal is changed.

The band pass filter 13 is one which passes a frequency component of a high frequency contained in the signal change portion. More specifically, a pass band is set so as to pass a frequency component of at least one part of the frequency components contained in the signal change portion, and an inhibition zone is set so as to inhibit frequency components constituting a main lobe of the demodulation signal. Here the signal change portion contains frequency components of a higher frequency than the frequency component constituting the main lobe of the demodulation signal.

Figure 2:
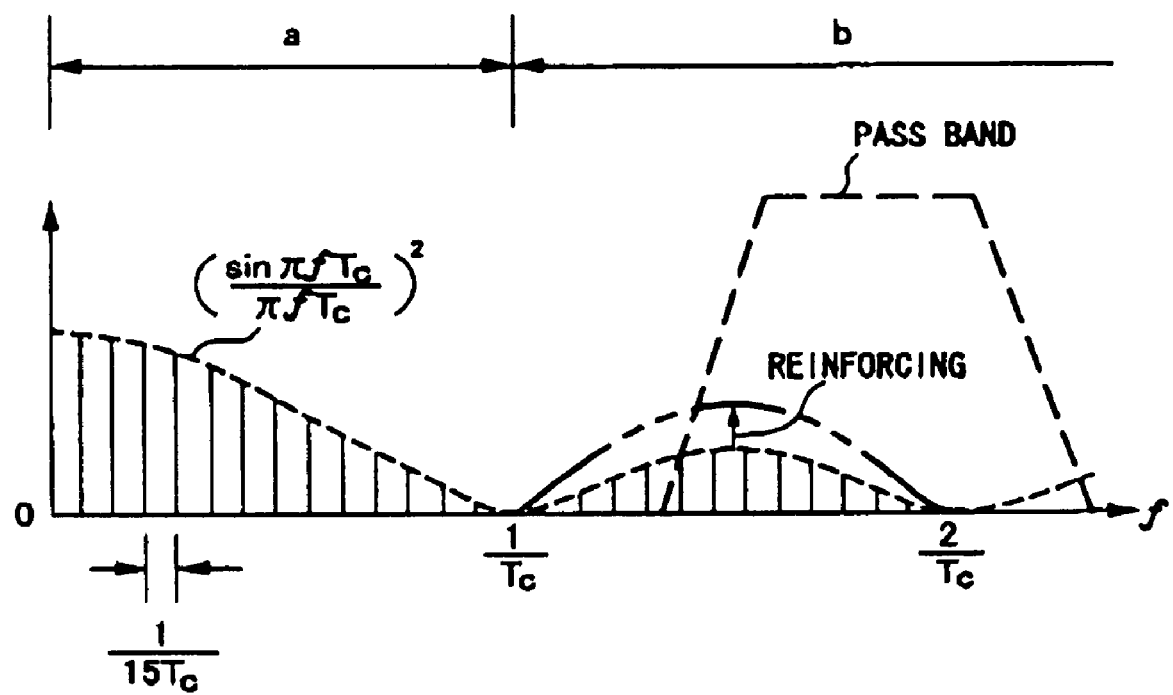
FIG. 2 is a diagram showing a setting example for a pass band of a band pass filter.

For example, the demodulation signal is a PN code used in a spectral diffusion signal. When a demodulation signal with the PN code as an M series 15 chip, is an iterative signal of this PN code, the power spectrum thereof has an envelope curve of $(\sin \pi fTc/\pi fTc)^2$ as shown in FIG. 2, and becomes an aggregate of the line spectrum for each $1/15$ Tc (Hz). Here Tc is the chip width. At this time, the pass band of the band pass filter 13, as shown by the broken line in FIG. 2, is set so as to pass a frequency component (range b in the figure) which is higher than a frequency component (range a in the figure) constituting the main lobe. Moreover, by making an existence range on the time axis of the signal change portion, a range which is narrower than one matching length (one chip width) of the PN code, a frequency component which is higher than the fundamental frequency of the demodulation signal (PN code) is contained in the signal change portion. As a result, when the demodulation signal is input to the band pass filter 13, a fitter output signal is produced, and the width of the signal waveform of this fitter output signal does not dependent on the chip rate of the diffusion code, and hence reception time measurement of a higher accuracy than the case where the conventional spectral diffusion communication is used is possible. In FIG. 2, the x-axis shows the frequency, the y-axis shows the power, and "a" shows the main lobe region, and "b" shows the region of high frequency contained in the signal change portion.

Furthermore, the band pass filter 13 may be constructed with a low pass filter and a high pass filter connected in cascade. In this case, both of the low pass filter and the high pass filter use one having a pass band which is wide compared to a single band pass filter, and the cut off frequency of the low pass filter is made a high pass side cut off frequency of the band pass filter 13, and the cut off frequency of the high pass filter is made a low pass side cut off frequency of the band pass filter 13. Regarding the connecting sequence for the low pass filter and the high pass fitter, either may be before the other. If the band pass filter 13 is constructed in this way, ringing produced in the filter output signal may be kept under control for a short term. Therefore the position of the signal change portion in the filter output signal can be easily detected, and the reliability of the reception time measurement improved.

Figure 3:
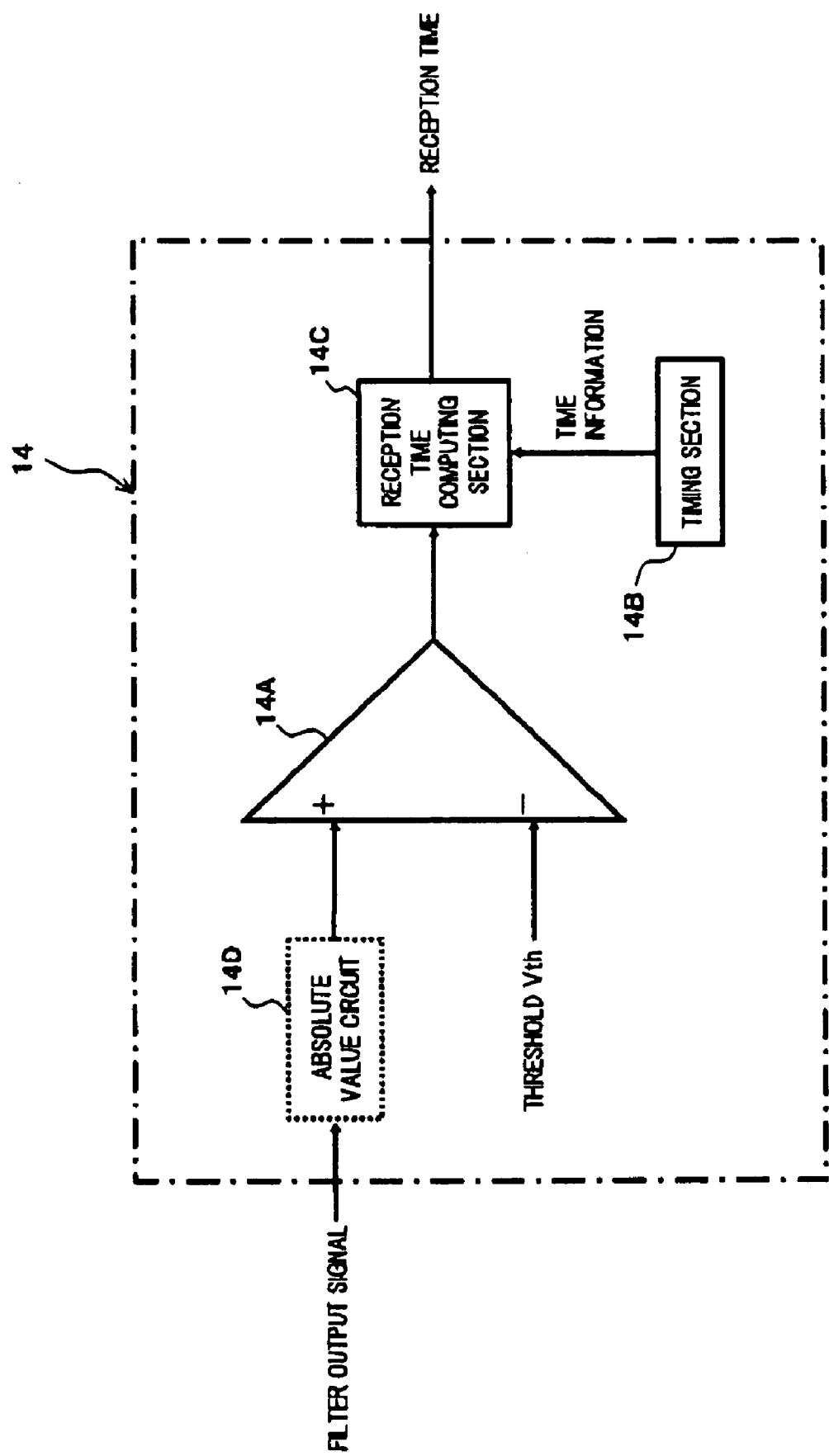
FIG. 3 is a block diagram of a time measurement section.

The time measurement section 14, for example as in FIG. 3, comprises a level comparator 14A, a timing section 14B, and a reception time computing section 14C. The level comparator 14A compares the signal level of the filter output signal which is input from the band pass filter 13 with a previously set threshold Vth, and when the signal level of the filter output signal is greater than or equal to the threshold Vth, outputs a signal of logic value 1 to the reception time computing section 14C. The timing section 14B outputs present time information to the reception time computing section 14C. The reception time computing section 14C measures the reception time of the signal change portion by the time information for when a signal of logic value 1 is input from the level comparator 14A, that is, measures the reception time of the reception signal. As shown by the dotted line in FIG. 3, the construction may be such that there is provided an absolute value circuit 14D, which inputs the absolute value of the filter output signal to the level comparator 14A.

Here is a description of the demodulation signal containing the signal change portion.

The signal change portion, as mentioned above, is the portion in the demodulation signal where at least one of the voltage level, the frequency, and the phase changes.

For the demodulation signal, a signal F(t) expressed for example by the following expression is considered.

$$F(t)=V \times \cos[\omega t + \cos^{-1}(f(t))]$$

Here f(t) is a signal having a +1 period, a −1 period, and a period where +1 (or −1) changes to −1 (or +1). The waveform of the change period is expressed for example by the expression shown in the following example one, and example two (Expression 1 and Expression 2).

EXAMPLE 1

Portion changing from −1 to +1

$$f_1 u(t) = 2t/aT - aT/2 \leq t \leq aT/2$$

Portion changing from +1 to −1

$$f_1 d(t) = -2t/aT - aT/2 \leq t \leq aT/2$$

EXAMPLE 2

Portion changing from −1 to +1

$$f_2 u(t) = \begin{cases} \left(\dfrac{2t+T}{T}\right)^p - 1 & -T/2 \leq t \leq 0 \\ -\left(\dfrac{-2t+T}{T}\right)^p + 1 & 0 \leq t \leq T/2 \end{cases} \quad \text{Expression 1}$$

Portion changing from +1 to −1

$$f_2 d(t) = \begin{cases} -\left(\dfrac{2t+T}{T}\right)^p + 1 & -T/2 \leq t \leq 0 \\ \left(\dfrac{-2t+T}{T}\right)^p - 1 & 0 \leq t \leq T/2 \end{cases} \quad \text{Expression 2}$$

Here p is a natural number. By appropriately setting the value of "a" in example 1 or the value of "p" in example 2, this can be made a demodulation signal which satisfies the regulation value of the radio wave method or the like, without using a low pass filter having a predetermined cut off frequency for satisfying the restriction of the radio wave method.

In the above expression for the demodulation signal F(t), when $\omega=0$, $F(t)=V \times f(t)$. In this case, the signal change portion is the portion in which the voltage level changes from +V to −V, and the portion where this changes from −V to +V. Furthermore, when $\omega \neq 0$, f(t) changes on the time axis from +1 to −1, or from −1 to +1, and hence a non linear change of the phase (frequency change) occurs in the demodulation signal F(t), and this portion becomes the signal change portion.

Figure 4:
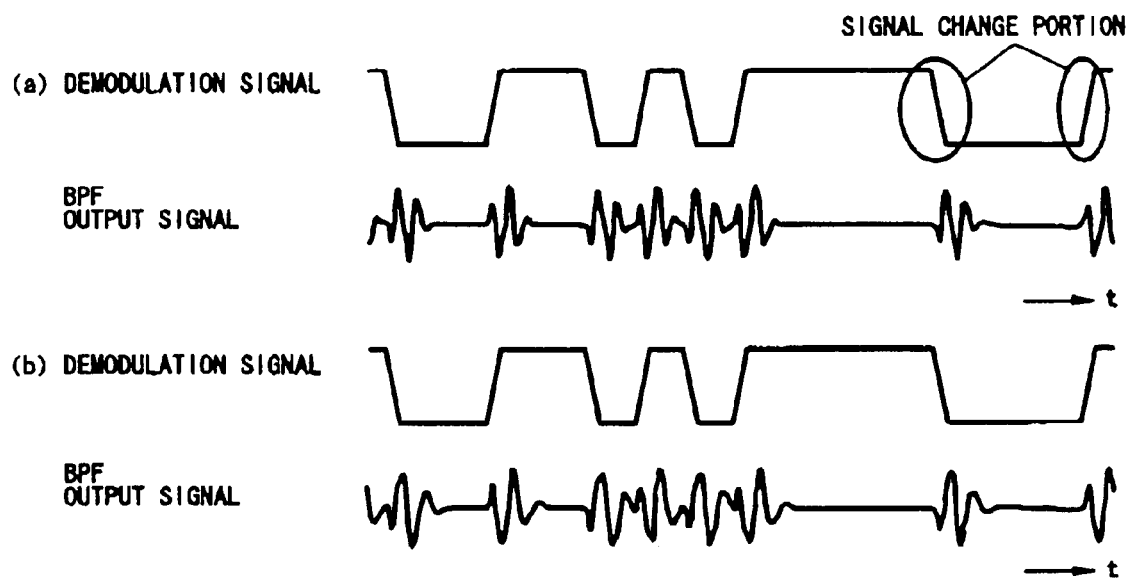
FIG. 4 is a diagram showing an example of a demodulation signal waveform, and a band pass filter output signal waveform, for when $\omega=0$ in an expression for a demodulation signal $F(t)$.

FIG. 4 is an example of the waveform of the demodulation signal F(t) for when ω=0 in the expression for the demodulation signal F(t), and of the output signal waveform of the band pass filter (BPF). Here signal f(t) is the PN code of the M series 15 chip, 5 Mcps, and the signal change portion is configured with a waveform of for example a=¼. The signal change portion of FIG. 4 is the portion where the voltage level changes in the demodulation signal F(t). A part of this is shown enclosed by a circle. For the band pass filter, in (a) of FIG. 4, this is one where a Butterworth low pass filter of a 25 MHz cut off frequency and a Butterworth high pass filter of a 15 MHz cut off frequency are connected in cascade. In (b) of FIG. 4, this is one where a Butterworth low pass filter of 30 MHz cut off frequency and a Butterworth high pass filter of 10 MHz cut off frequency are connected in cascade.

Figure 5:
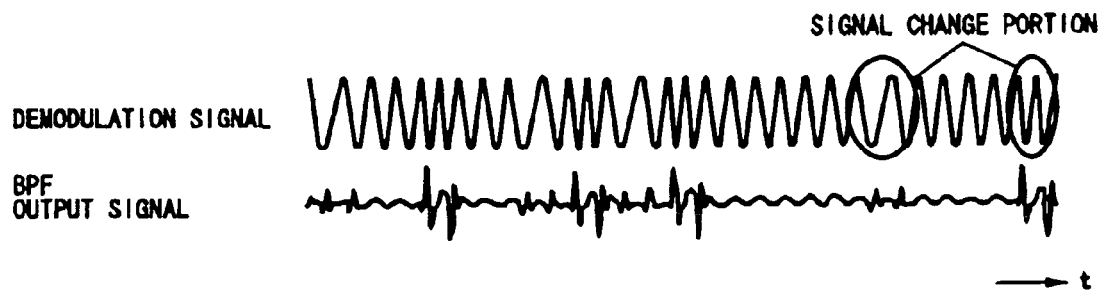
FIG. 5 is a diagram showing an example of a demodulation signal waveform, and a band pass filter output signal waveform, for when $\omega \neq 0$ in the expression for the demodulation signal $F(t)$.

FIG. 5 is an example of the waveform of the modulation signal F(t) for when ω≠0 in the expression of the demodulation signal F(t), and the output signal waveform of the band pass filter. Here the signal F(t) is the PN code as with the case of FIG. 4, and is configured by the waveform of a=½ of example 1. Furthermore, this is made ω=2π×10 MHz. The signal change portion of FIG. 5 is the portion where the phase in the demodulation signal F(t) changes non linearly (frequency changes). One part thereof is shown enclosed in a circle. For the band pass filter, there is one where a Butterworth low pass filter of 40 MHz cut off frequency and a Butterworth high pass filter of 35 MHz cut off frequency are connected in cascade.

In the transmitter 1, the modulation section 3 can use various types of modulation method such as amplitude modulation or angle modulation. As described above it should send a transmission signal which periodically generates a demodulation signal where the signal change portion is unevenly distributed on the time axis. The demodulation section 12 of the receiver 10 is, needless to say, of a configuration which can demodulate the transmission signal from the transmitter 1.

FIGS. 6 (A) and (B) show configuration examples of the modulation section 3 and the demodulation section 12 shown in FIG. 1.

FIG. 6 (A) shows the modulation section 3, and (B) shows the demodulation section 12.

In FIG. 6 (A), the modulation signal fM(t) is generated in the modulation signal generating section 2. This is a signal the same as the demodulation signal which should be originally generated in the demodulation section 12 of the receiver 10. For example this is the aforementioned F(t).

The modulation and demodulation operation using the modulation section 6 and the demodulation section 12 of FIG. 6 will be described. In the modulation section 3, when the modulation signal fM(t) is input, then in the V/F converter, the central frequency fo is frequency modulated by the modulation signal fM(t) and converted to a signal fco(t) of a baseband frequency band, and this frequency modulation signal fco(t) is frequency converted to a radio band in a frequency converter, by a modulation reference signal (frequency fr) of the source signal RF, and unnecessary frequency band components are removed in a filter, and a transmission signal fSD(t) is generated and transmitted. On input to the demodulation section 12 of FIG. 6 which receives this transmission signal fSD(t), the transmission signal fSD(t) is frequency converted in a frequency converter by a demodulation reference frequency (frequency fr) of the signal source LO, then unnecessary frequency band components are removed in a filter, and it is input to a F/V converter as a frequency conversion signal fDN(t) of the baseband frequency band. In the F/V converter, a frequency detection signal fDM(t) of a voltage level proportional to the frequency of the signal fDN(t) is generated. This frequency detection signal fDM(t) is expressed by the following expression with for example the frequency fo as a reference of the voltage output.

$$fDM(t)=D \cdot fM(t) (D \text{ is a constant})$$

From this expression fM(t) can be obtained as the demodulation signal. Furthermore, it is understood that the transmitter 1 can transmit a transmission signal which generates the demodulation signal fM(t).

FIGS. 7 (A) and (B) show a different configuration example of the modulation section 3 and the demodulation section 12.

FIG. 7 (A) shows the modulation section 3, and (B) shows the demodulation section 12.

FIG. 7 is a typical orthogonal modulator/demodulator circuit. In the operation of the modulation section 3, the modulation signal fMI(t) is made the is input, and the modulation signal fMQ(t) is made the Qs input, and in the orthogonal modulator, the modulation reference signal (frequency fr) from the signal source LO1 is modulated by the is input and the Qs input, and a signal fQM(t) is output. The unnecessary frequency band components of the output signal fQM(t) are removed by a filter, and a transmission signal fSD(t) is transmitted. Here, fMI(t) and fMQ(t) are determined so that fMI(t)$^2$+fMQ(t)$^2$=1 holds, giving the following equation.

$$fMI(t)=fM(t)$$

$$fMQ(t)=\sin[\cos^{-1}(fM(t))]$$

where (|fM(t)|≦1).

Here fM(t) is for example the aforementioned f(t).

Furthermore, the filter and fM(t) are determined so that the transmission signal fSD(t) output from the filter becomes substantially the same as fQM(t). As a result, fSD(t)=fQM(t).

On input to the demodulation section 12 which receives the transmission signal fSD(t), the orthogonal demodulator demodulates the reception signal by the demodulation reference signal (frequency fp) from the signal source LO2, and orthogonal demodulation signals fIR(t) and fQR(t) which have an orthogonal relation to each other are output. A filter then removes the unnecessary frequency components, and signals fDI(t) and fDQ(t) are output. Here fDI(t) and fDQ(t) are expressed by the following expression.

$$fDI(t)=E' \cdot \cos[2\pi(fp-fr)t+\cos^{-1}(fM(t))+\phi']$$

$$fDQ(t)=E' \cdot \sin[2\pi(fp-fr)t+\cos^{-1}(fM(t))+\phi']$$

Here E' is a constant. In the above expression, if the phase difference φ'=0 can be maintained, then;

$$fDI(t)=E' \cdot \cos[2\pi(fp-fr)t+\cos^{-1}(fM(t))]$$

$$fDQ(t)=E' \cdot \sin[2\pi(fp-fr)t+\cos^{-1}(fM(t))]$$

If the configuration is such that 2π(fp−fr)=ω, and fM(t)=f(f), and the phase difference φ'=0 can be maintained, then fDI(t) can be used as the aforementioned demodulation signal F(t). In the case where fp=fr, ω=0.

Hereunder is a description of the measuring operation of the first embodiment.

In the transmitter 1, in the case of the modulation section 3 of FIG. 6, the modulation signal generating section 2 generates the modulation signal fM(t), and in the case of FIG. 7, generates fMI(t) and fMQ(t), and inputs this to the modulation section 3, and as mentioned before the transmission signal fSD(t) is transmitted from the modulation section 3. Here the modulation signal fM(t) or fMI(t) is for example the aforementioned F(t), and by appropriately setting the value for "a" of the aforementioned example 1 or "p" of example 2, the transmission signal fSD(t) can be one where the frequency band width satisfies the regulation of the occupied bandwidth of the radio wave method or the like.

In the receiver 10, the transmission signal fSD(t) is received and input to the reception time determining apparatus 11. In the reception time determining apparatus 11, the reception signal is input to the demodulation section 12, and as mentioned before, the demodulation section 12, in the case of FIG. 6, outputs the demodulation signal fDM(t) (=fM(t)), and in the case of FIG. 7, outputs fDI(t) (=fM(t): where the phase difference $\phi'=0$ is maintained) as the demodulation signal. The demodulation signal fDM(t) or fDI(t) is input to the band pass filter 13, and from the band pass filter 13 a filter output signal such as in FIG. 4 or FIG. 5 is produced. The output signal from the band pass filter 13 is input to the level comparator 14A of the time measurement section 14, and compared with a previously set threshold Vth, and if the signal level of the filter output signal is greater than or equal to the threshold Vth, a signal of logic value 1 is input from the level comparator 14A to the reception time computing section 14C. Time information from the timing section 14B is input one by one to the reception time computing section 14C, and the reception time computing section 14C reports the time for when a signal of logic value 1 is input from the level comparator 14A, as the reception time of the reception signal. In the case where the filter output signal is a negative value, an absolute value circuit 14D as shown by the dotted line in FIG. 3, may be provided, and this then input to the level comparator 14A.

According to such a construction, by using a frequency component which is higher than the frequency component constituting the main lobe of the demodulation signal, and which is contained in the signal change portion, the reception time for the reception signal can be detected with high accuracy without expanding the occupied bandwidth of the radio signal. Consequently, limited frequency resources can be effectively utilized, so that the practical effect is great.

Next is a description of a second embodiment of the present invention.

In radio communication, it is necessary to consider noise mixing with the reception signal. In the case where noise is mixed with the reception signal, this interferes with the detection of the signal change portion contained in the demodulation signal, so that there is concern that the noise will be mistakenly detected as the signal change portion, inviting a deterioration in the time measurement accuracy.

The second embodiment is one configured so as to prevent erroneous measurement due to noise. The construction is such that for example between the band pass filter 13 and the time measurement section 14 of FIG. 1 there is provided a correlation computing section 20 of the configuration of FIG. 8, serving as an erroneous measurement prevention section.

Figure 8:
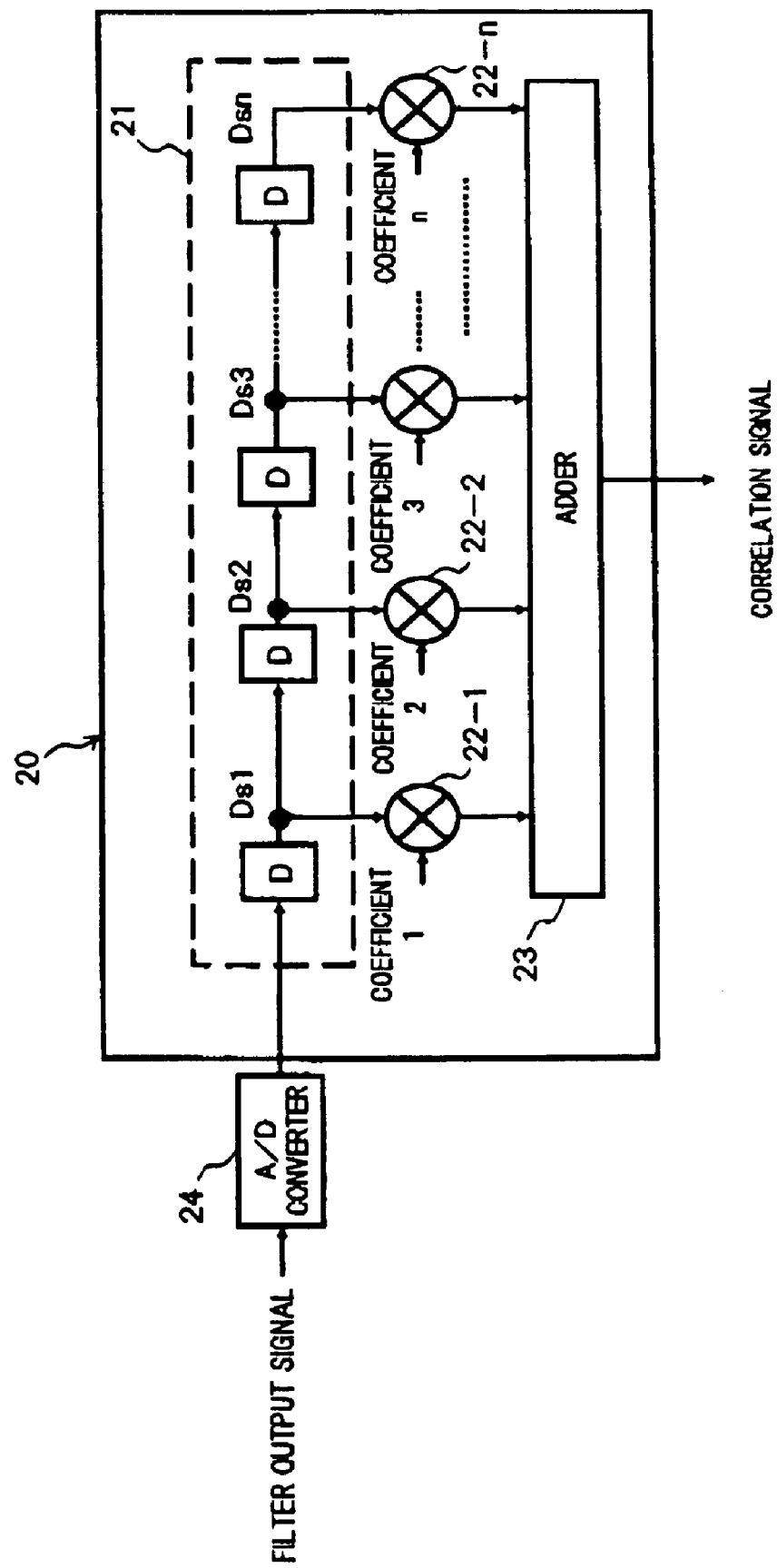
FIG. 8 is a block diagram of a correlation computing section in a second embodiment of a reception time determining apparatus of the present invention.

In FIG. 8, the correlation computing section 20 is one which performs correlation calculation between and input signal and a correlation reference signal, and outputs a correlation signal of a high level the higher the similarity of the two signals. It comprises: a delay circuit 21 comprising n delay elements D: n multiplier circuits 22-1 to 22-n which respectively multiply outputs Ds1 to Dsn of the respective delay elements D with correlation coefficient 1 to correlation coefficient n determined from the correlation reference signal; and an adder 23 which adds the outputs of the n multipliers 22-1 to 22-n and outputs a correlation signal.

Next is a description of the operation of the correlation computing section 20 of FIG. 8.

The analog output signal of the band pass filter 13 is converted to a digital signal in an A/D converter 24, and then input to the correlation computing section 20. The input signal is propagated in the delay circuit 21 while being delayed by the respective delay elements D, and during propagation the coefficient 1 to coefficient n are affixed to the outputs Ds1 to Dsn of the respective delay elements D, by the multipliers 22-1 to 22-n. The multiplication result is added by the adder 23, and output as a correlation signal. The coefficient 1 to coefficient n are determined from a correlation reference signal which realizes a correlation calculation for the input signal and the correlation reference signal, so that a correlation signal of a high level is generated from the adder 23 when the output pattern of the outputs Ds1 to Dsn of the delay circuit 21 is a generation pattern for the filter output signal which should originally be generated. Here the correlation reference signal is determined so as to regard the filter output signal of the family which should be originally generated as a signal with high similarity. As a result, if the output signal is input to the delay circuit 21, and the output pattern of the delay circuit 21 is a generation pattern of a filter output signal which should originally be generated, then a correlation signal of a high level is generated from the adder 23. Thereafter, provided that the original generation pattern continues, a correlation signal of a high level greater than or equal to the threshold Vth in the time measurement section 14 is generated from the adder 23. For example, if due to noise mixing, the generation pattern of the filter output signal is different from the original pattern, then the correlation signal level from the adder 23 is lower than the threshold Vth. As a result, if a noise is present, an output of logic value 1 from the level comparator 14A is not generated, and the reception time is not reported, so that the erroneous measurement due to noise can be prevented.

Figure 9:
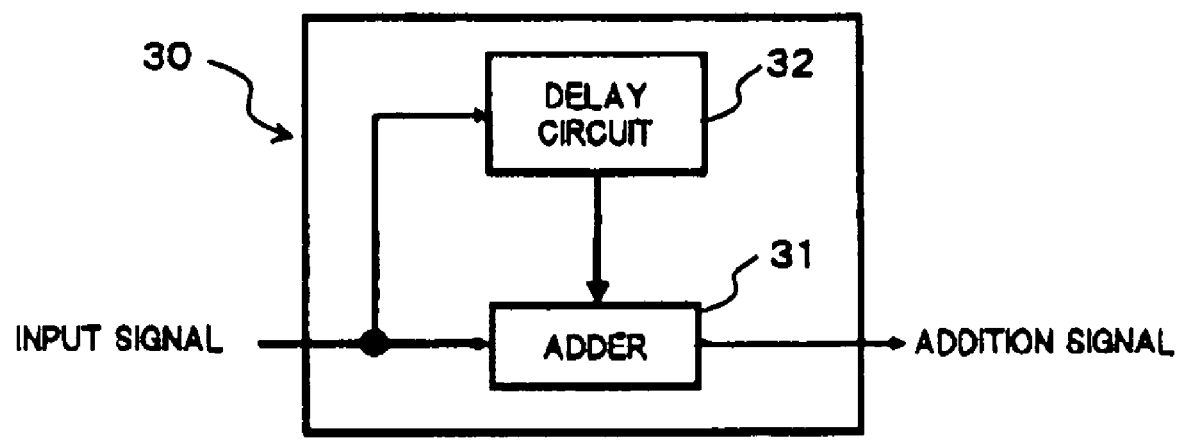
FIG. 9 is a block diagram showing a noise suppressing section.

Moreover, in order to prevent erroneous measurement due to noise, then instead of the correlation computing section 20 of FIG. 8, for example the configuration may be such that a noise suppressing section 30 of the configuration of FIG. 9 is provided as the erroneous measurement prevention section between the demodulation section 12 and the band pass filter 13.

The noise suppressing section 30 of FIG. 9 comprises an adder 31, and a delay circuit 32. The input signal is input to the adder 31 and the delay circuit 32. The delay circuit 32 delays the input signal a predetermined time, and then transmits this to the adder 31. The adder 31 adds the input signal and the delay output of the delay circuit 32, and outputs this addition signal to the band pass filter 13 as a demodulation signal for input. Here regarding the demodulation signal which is input to the noise suppressing section 30, a signal waveform of a predetermined period is made one unit, and this signal waveform is repeated to configure the signal. This predetermined period is set so that one or more signal change portions are contained in the demodulation signal.

With such a construction, if the delay time of the delay circuit 32 is set to the same as the repetition period of the signal waveform, then the adder 31, if noise is not present, adds the signal waveforms of the predetermined period, and the demodulation signal is emphasized and input to the band pass filter 13, with the noise suppressed. If a noise is present, it becomes an addition signal of a different waveform to the demodulation signal which should originally be generated.

The noise suppressing section 30 of FIG. 9 may be provided between the band pass filter 13 and the time measurement section 14. Furthermore, the correlation computing section 20 of FIG. 8 and the noise suppressing section 30 of FIG.

9 may be combined. For example there may be considered a configuration where, the noise suppressing section 30 is provided between the demodulation section 12 and the band pass filter 13, and the correlation computing section 20 is provided between the band pass filter 13 and the time measurement section 14, or the noise suppressing section 30 and the correlation computing section 20 are provided in sequence from the band pass filter 13, between the band pass filter 13 and the time measurement section 14.

Furthermore, in the case where the strength of the transmission signal generated by the demodulation signal F(t) falls below the regulation value, then if at least one part of the frequency component contained in the pass band of the band pass filter 13 is made a frequency component, and for example a transmission signal is generated such that the strength of the side lobe component generates a demodulation signal F'(t) which reinforces the strength of the side lobe as shown by the two dot chain line in FIG. 2, and this is transmitted, then the S/N ratio of the band pass filter output corresponding to the same noise can be improved, and the tolerance of the time measurement accuracy to noise mixing with the reception signal can be improved.

Here, the demodulation signal F'(t) in which the strength of at least one frequency component contained in the pass band of the band pass filter 13 has been reinforced, can be obtained for example from the following 1), and 2) methods.

1) Fourier Transform Method

The demodulation signal F(t) is Fourier transformed and the intensity level of at least one part of the frequency component contained in the band pass of the band pass filter is increased, after which the demodulation signal F'(t) is obtained by inverse Fourier transform.

2) Equalizer Method

The demodulation signal F(t) is input to an equalizer which is set so that the strength of at least one part of the frequency component contained in the pass band of the band pass filter is reinforced, and the obtained signal is made the demodulation signal F'(t).

Consequently, the transmission signal which generates the demodulation signal F'(t) can be generated for example in the following manner. For example, in the case of the modulation method of FIG. 6, for the modulation signal fM(t) of the transmitter, the demodulation signal fDM(t)=D·fM(t) is obtained by the receiver. The fDM'(t) reinforced for the fDM (t) can be generated if the method of 1) or 2) is applied to the demodulation signal fM(t). Furthermore, in the case of the modulation method of FIG. 7, the demodulation signal fDI(t) is expressed as mentioned before as phase difference φ=0. After this, the fDI'(t) reinforced for the demodulation signal fDI(t) can be generated by applying the method of 1) or 2) to the modulation signal fM(t).

However, the above mentioned improvement method suffers the restriction of the radio wave method and the like in the case of performing radio communication. Therefore, this can only be applied in the case where the strength of the transmission wave does not exceed the regulation value of the radio wave method. That is, in the case where the strength of the transmission signal for generating the demodulation signal F(t) falls below the regulation value, reinforcement of the strength of at least one part of the frequency component contained in the pass band of the band pass filter is possible in a range where the strength of the transmission signal does not exceed the regulation value.

Next is a description of a third embodiment of the present invention.

In the case where the orthogonal demodulation circuit of (B) of FIG. 7 is used in the demodulation section 12, then maintenance of the phase difference φ'=0 is necessary. However for this, generally, a complex structure for phase holding is necessary, so that the apparatus becomes complicated.

Figure 10:
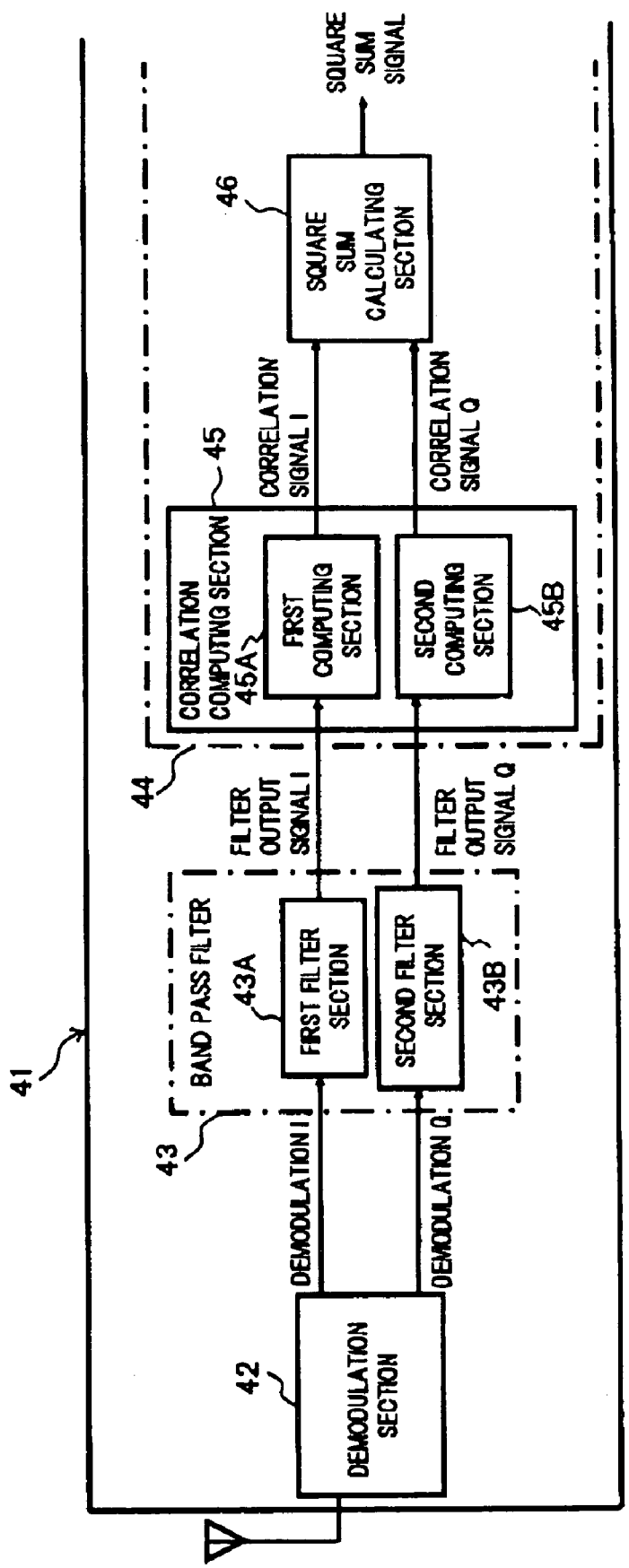
FIG. 10 is a partial block diagram of a third embodiment of a reception time determining apparatus according to the present invention.

The third embodiment of the present invention shown in FIG. 10 is one where the complicated phase holding structure is made unnecessary.

In FIG. 10, a demodulation section 42 of a reception time determining apparatus 41 of this embodiment has a configuration as shown in FIG. 7 (B). Furthermore, a band pass filter 43 comprises a first filter section 43A which on input of a demodulation signal I outputs a filter output signal I, and a second filter section 43B which on input of a demodulation signal Q outs a filter output signal Q. The first filter section 43A and the second filter section 43B each have the same construction as the band pass filter 13 of FIG. 1. A time measurement section 44 is constructed with a correlation computing section 45 and a square sum calculating section 46 added to the construction of FIG. 3, and a square sum signal of the square sum calculating section 46 is input to a level comparator 14A. Here the demodulation signal I corresponds to the first demodulation signal, and the demodulation signal Q corresponds to the second demodulation signal. Furthermore, the first filter section 43A and the second filter section 43B correspond to the first and second detection sections, and the filter output signal I and the filter output signal Q correspond to the first and second signal change portion detection signals.

The correlation computing section 45 comprises a first computing section 45A which executes correlation computation of the filter output signal I and the correlation reference signal, and outputs a correlation signal I, and a second computing section 14B which executes correlation computation of the filter output signal Q and the correlation reference signal, and outputs a correlation signal Q. The first computing section 45A and the second computing section 45B are each configured the same as in FIG. 8. Here for the correlation reference signal of the first computing section 45A and the second computing section 45B the same signal is used. For example, when the phase difference is φ'=0, the filter output signal I which should be originally generated is used. The correlation signal I corresponds to the first correlation signal, and the correlation signal Q corresponds to the second correlation signal.

Figure 11:
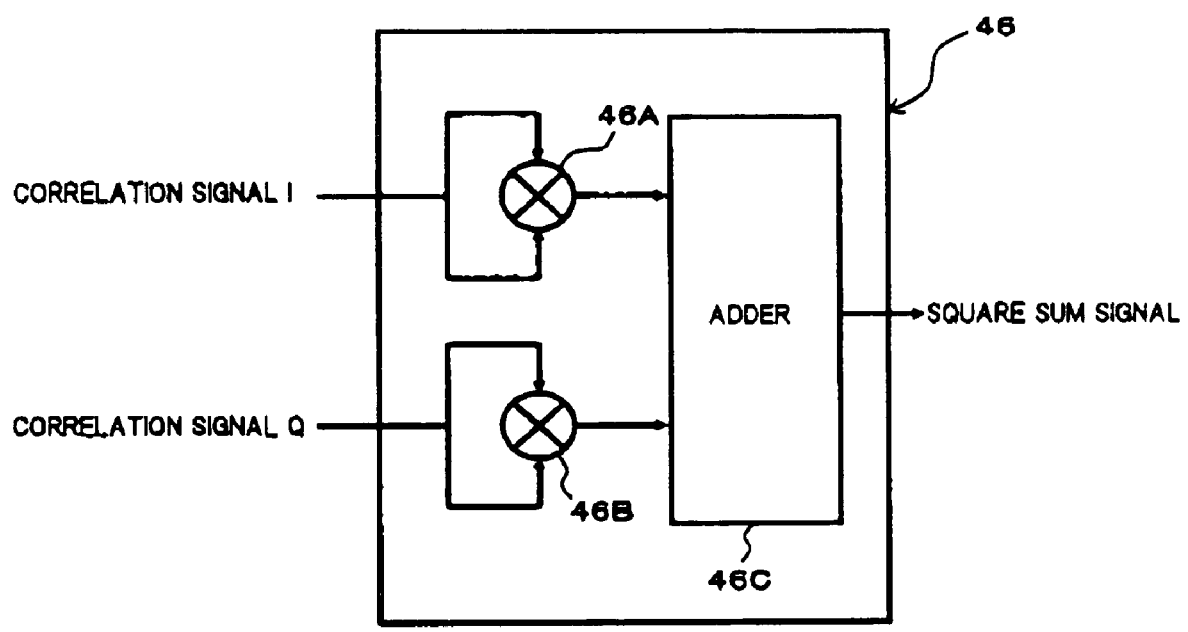
FIG. 11 is a block diagram of a square sum calculating section.

The square sum calculating section 46, as shown in FIG. 11 comprises a multiplier 46A which performs a squaring calculation for the correlation signal I, a multiplier 46B which performs a squaring computation for the correlation signal Q, and an adder 46C which adds the outputs of the two multipliers 46A and 46B, and outputs a square sum signal.

If noise need not be considered, then the correlation computing section 45 is unnecessary.

With such a construction, information of the signal change portion is contained in the respective demodulation signals I and Q, and the filter output signals I and Q which contain information of the signal change portion from the respective first and second filters 43A and 43B of the band pass filter 43 are output, and the respective added signals as described before from the first and second calculating sections 45A and 45B of the correlation computing section 45 are output as correlation signals I and Q. These correlation signals I and Q are subjected to a square sum computation in the respective multipliers 46A and 46B of the square sum calculating section 46, and the square sum signals added in the adder 46C are compared with the threshold Vth in the level comparator 14A, and the reception time is calculated by the reception time calculation section 14C.

According to such a construction, by square sum calculation in the square sum calculating section 46, the influence of the phase difference ϕ' can be excluded. Furthermore, by providing the correlation computing section 45, the influence of noise can be suppressed. Consequently, the reception time can be measured at high accuracy.

In the above mentioned respective embodiments, a PN code can be used for the demodulation signal. The PN code is a binary data signal. Since the transition point of the data signal on the time axis has a plurality of points, then it is considered to make the signal for where the PN code is band limited by the low pass filter, or the signal obtained by substituting the change portion of the data value of the PN code by $f_1u(t)$, or $f_1d(t)$, the demodulation signal, or the aforementioned $f(t)$. The PN code is a pseudo noise signal used in spread spectrum communication. Here the various types of code sequences such as the M sequence, the Gold sequence, or the Barker sequence can be used.

Next is a description of a fourth embodiment of the present invention for a case where the demodulation signal is constituted by a PN code.

Figure 12:
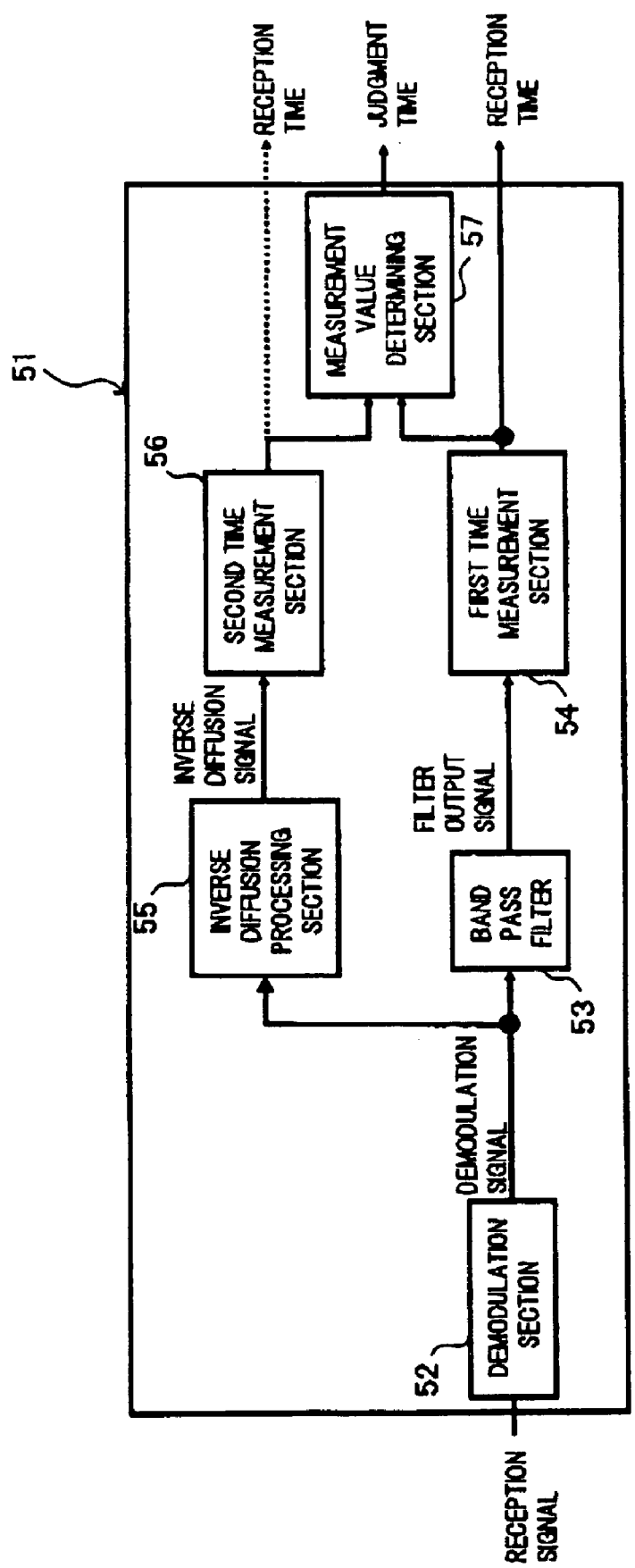
FIG. 12 is a block diagram showing a fourth embodiment of a reception time determining apparatus of the present invention.

FIG. 12 is a block diagram of a reception time determining apparatus of the present embodiment.

In FIG. 12, the reception time determining apparatus 51 of the present embodiment comprises; a demodulation section 52, a band pass filter 53, a first time measurement section 54, an inverse diffusion processing section 55, a second time measurement section 56, and a measurement value determining section 57. The demodulation section 52 and the band pass filter 53 have the same configuration as for the first embodiment. The first time measurement section 54 is configured with the correlation computing section 20 of FIG. 8 provided before the level comparator 14A of FIG. 3.

The inverse diffusion processing section 55 digitizes the demodulation signal constituted by the PN code in an A/D converter, and this digitized demodulation signal is inverse diffusion processed in a digital matched filter, and an inverse diffused signal is output. The second time measurement section 56 has the configuration of FIG. 3, and measures the time where the input inverse diffused signal becomes greater than or equal to a predetermined threshold, and inputs this as a reference reception time to the measurement value determining section 57. The measurement value determining section 57 determines the normal/abnormal of the reception time input from the first time measurement section 54 based on the reference reception time input from the band pass filter 53, and outputs a determination signal. The time measurement method using the inverse diffusion processing section 55 and the second time measurement section 56 is a measurement method which uses the aforementioned spread spectrum communication, which uses a known measuring method as disclosed in "Spread Spectrum Communication and its Application" (Marubayashi et. al., The Institute of Electronics, Information and Communication Engineers).

Next is a description of the operation of the fourth embodiment.

The demodulation signal from the demodulation section 52 is respectively input to the inverse diffusion processing section 55 and the band pass fitter 53. The filter output signal from the band pass filter 53 is input to the first time measurement section 54. In the first time measurement section 54, a correlation computation is executed for the filter output signal and the reference correlation signal, by means of the correlation computing section 20, and a correlation signal generated. In the case of the demodulation signal constituted by the PN code, the correlation signal becomes a high level in the period of the PN code. This correlation signal level and a threshold are compared in the level comparator 14A, and the time for when the correlation signal level becomes greater than or equal to a predetermined threshold is output to the measurement value determining section 57 as the reception time. The measurement value determining section 57 determines if the reception time of the first time measurement section 54 is normal or abnormal based on the reference reception time input via the inverse diffusion processing section 55, and the second time measurement section 56 as mentioned before.

Since the inverse diffused signal and the correlation signal are generated from the same demodulation signal, a constant relationship exists between the inverse diffused signal and the high level generation time of the correlation signal. That is, a constant relationship exists between the reception time and the reference reception time from the second time measurement section 56. Furthermore, the spread spectrum communication is a communication method in which the noise proof property is high. If the reference reception time obtained from the second time measurement section 56 is compared to the reception time obtained from the first time measurement section 54, the accuracy is poor but it is superior in the noise proof property. Therefore, the range (hereunder the reception time existence range) on the time axis where the reception time should exist based on the reference reception time is determined beforehand in consideration of measurement accuracy and the like. For example, before and after one chip width of the PN code with the reference reception time as the center, is determined as the reception time existence range. Furthermore, in the measurement value determining section 57, when the reception time of the first time measurement section 54 is within the reception time existence range, the reception time is judged to be a correct value, and normal is reported, while when outside of the reception time existence range, the reception time is judged to be an incorrect value, and abnormal is reported.

With such a construction, the accuracy of the reception time measurement is not worsened more than the measurement accuracy of the reference reception time. Furthermore, worsening of the measurement accuracy of the reception time due to noise increase can be detected, and hence the reliability of the reception time determining apparatus is improved.

As shown by the dotted line in FIG. 12, the configuration may be such that the reference reception time of the second time measurement section 56 is also output as the measurement reception time information.

In the case where the demodulation section 52 is the orthogonal demodulation circuit of (B) of FIG. 7, the reference reception time is influenced by the phase difference ϕ'. Consequently, if inverse diffusion processing sections which respectively inverse process the demodulation signals I and Q, and a square sum calculating section which square sum calculates the inverse demodulation signals respectively output from the inverse diffusion processing sections are provided, and the square sum signal from the square sum calculating section is input to the second time measurement section 56, and a reference reception time is calculated, the influence of the phase difference ϕ' on the reference reception time can be eliminated. The inverse diffusion processing sections may be constructed the same as the inverse diffusion processing section of FIG. 12, and the square sum calculating section may have the construction of FIG. 11. In this case, the band pass filter 53 and the first time measurement section 54 have the construction of the third embodiment shown in FIG. 10.

Next is a description of a fifth embodiment of the present invention for a case where the signal processing in the fourth embodiment of FIG. 12 is reduced.

As mentioned before, there is a constant relationship between the reception time obtained from the first time measurement section 54, and the reference reception time obtained from the second time measurement section 56, and the reception time existence region can be determined from the reference reception time. Since the reception time is measured based on the filter output signal, there is a predetermined correspondence on the time axis between this and the filter output signal. Consequently, the filter output signal range corresponding to the reception time existence range can be determined beforehand, and by performing measurement processing for the reception time only for signals within the filter output signal range, measurement processing for the reception time can be reduced.

Figure 13:
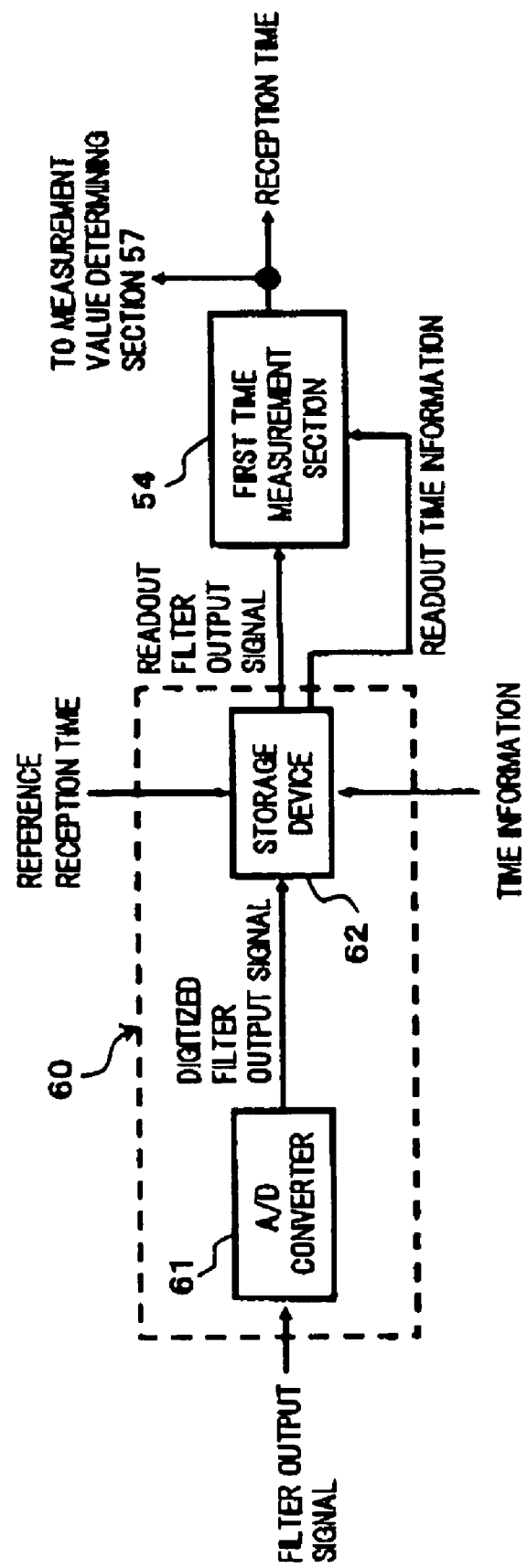
FIG. 13 is a block diagram showing a fifth embodiment of a reception time determining apparatus of the present invention.

FIG. 13 is a partial block diagram of a fifth embodiment of the present invention where reception time measurement processing is only performed in a predetermined filter output signal range.

In FIG. 13, the reception time determining apparatus of this embodiment comprises a signal storage section 60 after the band pass filter 53 of FIG. 12.

The signal storage section 60 comprises an A/D converter 61 which converts the filter output signal into a digitized filter output signal, and a storage device 62 which associates and stores the digitized filter output signal and time information, and determines a filter output signal range for use in subsequent signal processing based on an input reference reception time.

The operation of this embodiment will be explained.

When the filter output signal is input to the signal storage section 60, this is converted into a digitized filter output signal in the A/D converter 61, and sequentially input to the storage device 62. The storage device 62 associates the digitized filter output signal with time information for each input, and stores this. When the reference reception time from the second time measurement section 56 is input, a filter output signal region is determined based on the reference reception time, and from amongst the stored digitized filter output signals, one which corresponds to the filter output signal range is sequentially output to the first time measurement section 54 as a readout filter output signal according to the input sequence. At the same time, the associated and stored time information is sequentially output to the first time measurement section 54 as readout time information. The first time measurement section 54 measures the reception time from the correlation signal and the readout time information based on the filter output signal.

According to such a construction, since only a predetermined range of the filter output signal needs to be signal processed, the signal processing for reception time measurement can be reduced.

The construction may be such that the band pass filter 53 is provided after the A/D converter 61 of the signal storage section 60, as a digital filter. Moreover, the construction may be such that this is provided between the signal storage section 60 and the first time measurement section 54.

Next is a description of a sixth embodiment of the present invention.

In the case where the measured reception time is related to safety, there is a demand for high reliability for the reception time. The sixth embodiment shown in FIG. 14 is a configuration example for increasing the reliability of the reception time.

Figure 14:
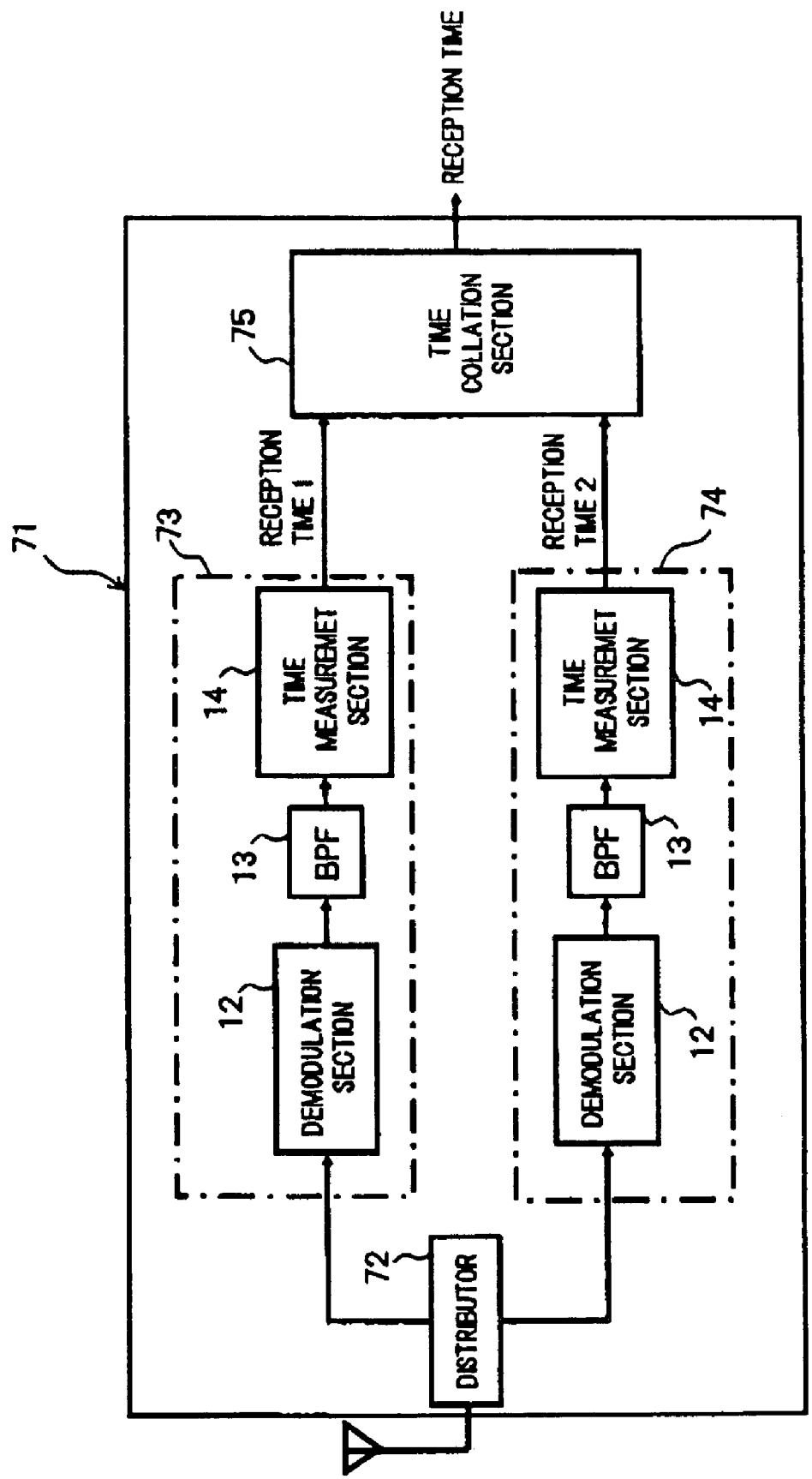
FIG. 14 is a block diagram showing a sixth embodiment of a reception time determining apparatus of the present invention.

In FIG. 14, a reception time determining apparatus 71 of the present embodiment comprises a distributor 72, a plurality, for example two, reception time measurement sections 73 and 74, and a time collation section 75.

The distributor 72 distributes the reception signal input from the antenna, to the respective reception time measurement sections 73 and 74.

The reception time measuring sections 73 and 74 each have the same configuration as the reception time determining apparatus 11 shown in FIG. 1, comprising the demodulation section 12, the band pass filter 13, and the time measurement section 14.

The time collation section 75 collates a reception time 1 measured by, and output from, the reception time measurement section 73, and a reception time 2 measured by, and output from, the reception time measurement section 74, and reports a final reception time, or an abnormal judgment.

In this sixth embodiment, the reception signal received by the antenna is respectively input to the demodulation sections 12 of the reception time measurement sections 73 and 74 via the distributor 72. In the reception time measurement sections 73 and 74, the reception times of the reception signals are respectively measured as described above, and the measurement results are respectively output to the time collation section 75 as reception time 1 and reception time 2. In the time collation section 75, the two reception times 1 and 2 are collated to determine a reception time. For example, if the two coincide, this value is reported as the reception time, and when they disagree, then abnormal is reported. Alternatively, the arrangement may be such that when a discrepancy in the two reception times 1 and 2 is within a predetermined range, the average value of the two reception times is reported as the reception time, and in the case where the difference is greater than the predetermined range, then abnormal is reported.

If in this manner, the reception time measurement section is a double system structure so that the measurement values of the respective reception time measurement sections are collated and the final reception time then determined, the reliability of the measured reception time can be increased.

In the case of a double system structure as in FIG. 14, the reception time measurement sections 73 and the 74 may have structures different from each other. In the case of such a structure, the respective systems perform different time measurement processing, and hence compared to the case where the reception time measurement sections 73 and 74 have the same structure as each other, the reliability of the time measurement can be increased. In the case where the reception time measurement section 73 and the 74 have a different structure to each other, in particular it is effective to make the pass band of the band pass filters 13 of the respective systems different. In this case there is: (1) the case where the pass band of one band pass filter is set so as to include the pass band of the other band pass filter, (2) the case where the pass band of both band pass filters are set so as to partially overlap; and (3) the case where both band pass filters are set so as not to overlap. As an example of the case of (1), for example the band pass filter on the reception time measurement section 73 side is constructed with a Butterworth low pass filter of a high pass side cut off frequency of 25 MHz and a Butterworth high pass filter of a low pass side cut off frequency of 15 MHz which connected in cascade, and the band pass filter on the reception time measurement section 74 side is constructed with a Butterworth low pass fitter of a high pass side cut off frequency of 30 MHz and a Butterworth high pass filter of a low pass side cut off frequency of 10 MHz which connected in cascade. Furthermore, as an example of the case of (3), for example the band pass filter on the reception time measurement section 73 side is constructed with a Butterworth low pass filter of a high pass side cut off frequency of 25 MHz and a Butterworth high pass filter of a low pass side cut off frequency of 15 MHz which connected in cascade, and the band pass filter on the reception time measurement section 74 side is constructed with a Butterworth low pass filter of a high pass side cut off frequency of 40 MHz and a ButterNorth high pass filter of a low pass side cut off frequency of 35 MHz which connected in cascade.

In this manner, if the pass band of the band pass filters 13 of each system are configured to be different, the components of the frequency components contained in the reception signal, which are used for time measurement are partially different for each system. Therefore a diversity occurs in the time measurement, so that it is difficult for an error in the time measurement due to common factors to occur.

Also in the single system configuration used in the fifth embodiment of FIG. 13, it is possible to increase the reliability of the time measurement. More specifically, in FIG. 13, a band pass filter is arranged as a digital filter between the storage device 62 of the signal storage section 60, and the first time measurement section 54. In this case, the demodulation signal is digitized in the A/D converter 61 and stored in the storage device 62 as a digitized demodulation signal. For this digitized demodulation signal, the reception time measurement is performed several times (for example two times). By so doing, a plurality of reception time measurement values are obtained. Therefore, if this plurality of reception time measurement values are collated in a time collater, an error in the reception time due to a temporary processing error can be discovered, and this can be eliminated, so that the reliability of the reception time can be improved. Furthermore, if the pass band of the band pass filter is made different for each time, the reliability can be further increased.

Next is a description of the case where a singularity contained in the signal change portion of the demodulation signal is detected, and the reception time is calculated from this singularity.

Figure 15:
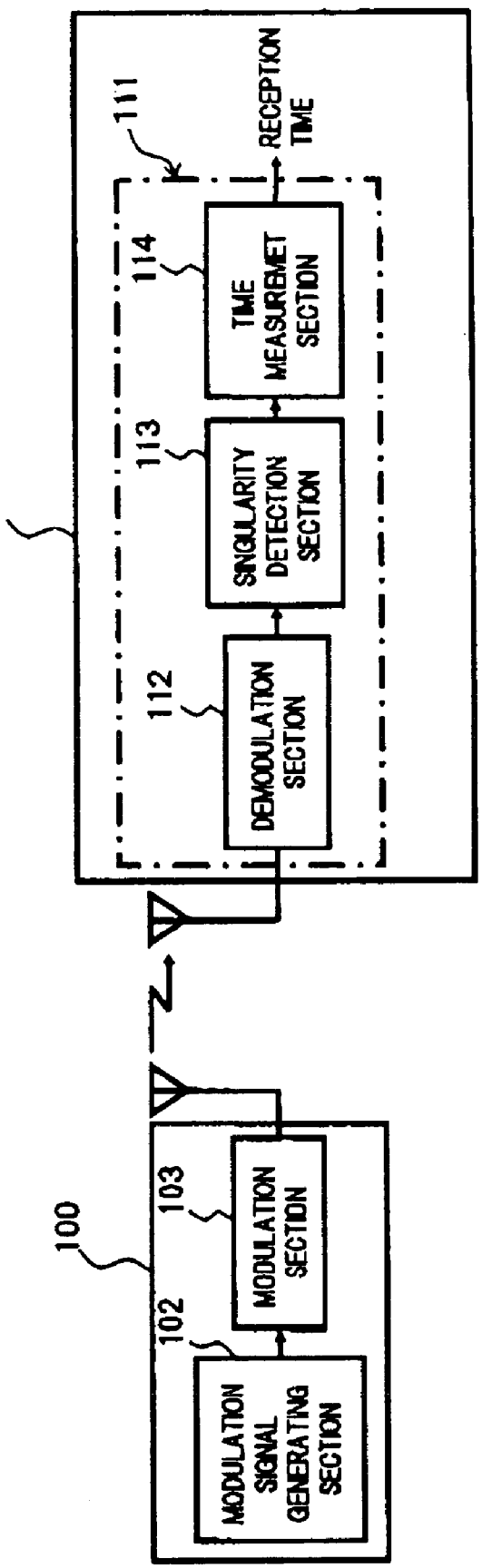
FIG. 15 is a block diagram showing a seventh embodiment of a reception time determining apparatus of the present invention.

FIG. 15 is a block diagram showing a configuration of a communication apparatus to which a seventh embodiment of a reception time determining apparatus according to the present invention is applied.

In FIG. 15, the communication apparatus comprises a transmitter 100 and a receiver 110 similar to in FIG. 1. The receiver 110 comprises a reception time determining apparatus 111 which measures the reception time of the transmission signal.

The transmitter 100 is configured such that it transmits a transmission signal which produces a demodulation signal for which a singularity exists locally on the time axis in the signal change portion in the demodulation section 112 of the reception time determining apparatus 111, and the signal level is continuous. It comprises a modulation signal generating section 102, and a modulation section 103, and a radio signal output from the modulation section 103 is transmitted from an antenna.

The reception time determining apparatus 111 of this embodiment comprises: the demodulation section 112 which demodulates the transmission signal input via the antenna, and outputs a demodulation signal; a singularity detection section 113 which on input of the demodulation signal, detects a singularity signal contained in the signal change portion of the demodulation signal, and outputs a singularity detection signal; and a time measurement section 114 serving as a first time measurement section which, on input of the singularity detection signal, measures the reception time of the reception signal and reports this. Here the singularity detection signal which is output by the singularity detection section 113 corresponds to the signal change portion detection signal.

The demodulation section 112 outputs a demodulation signal for which a singularity exists locally on the time axis, and the signal level is continuous. Here the singularity is a discontinuity that appears in the M-th order differential (M is a natural number) of the waveform of the demodulation signal.

The singularity detection section 113 detects the discontinuity which appears in the M-th order differential (where M is a natural number) of the waveform of the demodulation signal, and outputs this as a singularity detection signal. More specifically, a wavelet transformation is performed which can detect the discontinuity which appears in the M-th order differential, and the singularity detection signal is generated from the result of the wavelet transformation and output. In the case where discrete wavelet transformation is used for the wavelet transformation, this may be constructed using a subband dispersion filter.

Figure 16:
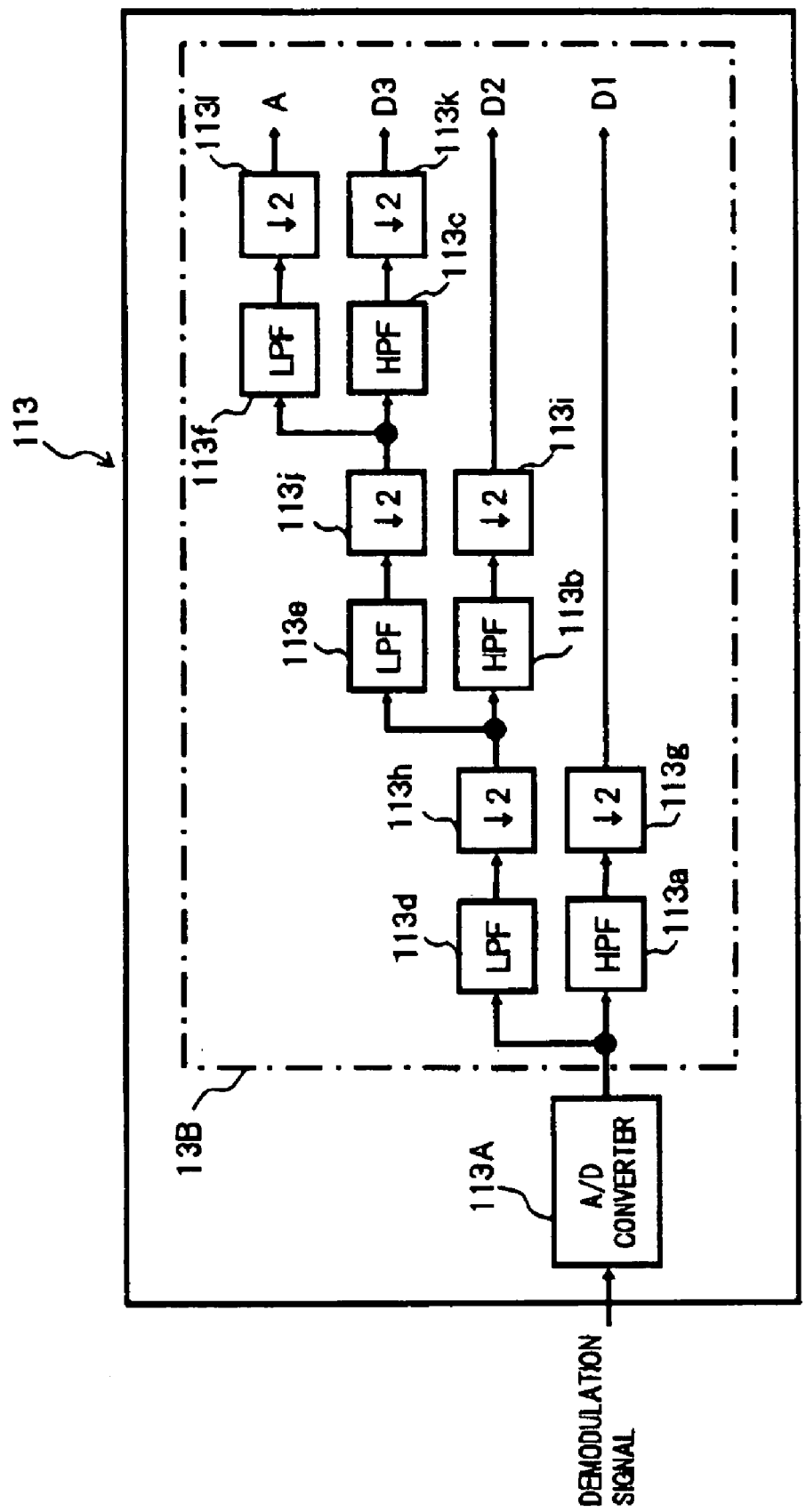
FIG. 16 is a block diagram of a singularity detection section.

FIG. 16 shows a configuration example of a singularity detection section 113 which uses a subband dispersion fitter which performs discrete wavelet transformation.

In FIG. 16, the singularity detection section 113 comprises an A/D converter 113A which A/D converts the demodulation signal, and a band pass four division subband dispersion filter 113B. The subband dispersion filter 113B comprises three HPFs 113a to 113c, three LPFs 113d to 113f, and six samplers 113g to 113l.

The demodulation signal is converted to a digital digitized demodulation signal in the A/D converter 113A, and input to the subband dispersion filter 113B. The input digitized demodulation signal is input to the HPF 113a and the LPF 113d, and the outputs are respectively thinned out one at a time in the sampling devices 113g and 113h and down sampled to ½. At this time, the output on the HPF 113a side is made D1. The output on the LPF 113d side is input to the subsequent HPF 113b and LPF 113e, and the outputs are down sampled to ½ in the respective sampling units 113i and 113j, and the output on the HPF 113b side is made D2. The output on the LPF 113e side is input to the subsequent HPF 113c and LPF 113f, and the outputs are down sampled to ½ in the respective sampling devices 113k and 113l, and the output on the HPF 113c side is made D3, and the output on the LPF 113f side is made A. Regarding the HPF and LPF sets, the frequency band of the demodulation signal is divided into two. Consequently, in the subband dispersion filter 113B, the digitized demodulation signal is divided in four bands in a ratio 4:2:1:1 from the high pass towards the low pass. In the time measurement using discontinuity detection, the accuracy improves the higher the frequency. In the present embodiment, the output D1 is output as the singularity detection signal.

Wavelet transformation is used in the field of signal processing or signal analysis. Concerning detection of the differential discontinuity by wavelet transformation, this is disclosed for example in; "Singularity Detection and Processing with Wavelets" (S. Mallat and W. L. Hwang: IEE Transactions on Information Theory, Vol. 38, No. 2, pp. 617-643 (1992-3)), "Wavelet Analysis and Filter Bank" (authored by G. Strang et al. Translated Tahahashi et. al., published by Baifukan), and "Wavelet Beginners Guide" (Sakakibara, Tokyo Denki University Press).

Regarding the time measurement section 14, in a configuration similar to FIG. 3, a singularity detection signal (in this embodiment, the output D1 of FIG. 16) is input to the level comparator 14A. In the case where the singularity detection signal is positive or negative, the construction may be such that an absolute value circuit 14D is provided, and the absolute value of the singularity detection signal is input to the level comparator 14A.

Here is a description of the demodulation signal which produces a discontinuity by the M-th order differential.

The waveform of the demodulation signal which produces a discontinuity by the M-th order differential has a construction where a plurality of waveforms represented by different continuous functions are connected, to thereby make the signal level continuous. As a result, a discontinuity appearing in the M-th order differential is produced in the continuous nodes of the plurality of waveforms represented by the different continuous functions. In the demodulation signal, the range in which the signal level constituted by the plurality of waveforms represented by the different continuous functions changes, is referred to as the signal level change portion (being the signal change portion).

The configuration type of the signal level change portion is more specifically as follows.

The signal level change portion is the range of $\alpha \leq t \leq \beta$, with the x-axis represented by the variable t. For example it is configured so that a discontinuity of the M-th order differential is produced in t=γ1, γ2∈[α, β](γ1<γ2). At this time, the signal level change portion is determined so that if it is constructed by; a waveform represented by a continuous function fa(t) defined by the range of $\alpha \leq t \leq \gamma 1$, a waveform represented by a continuous function fb(t) defined by the range of $\gamma 1 \leq t \leq \gamma 2$, and a waveform represented by a continuous function fc(t) defined by the range of $\gamma 2 \leq t \leq \beta$, then fa(t), fb(t), and fc(t) each satisfy at least the following conditions of (1) to (4).

$$fa(\gamma 1)=fb(\gamma 1), fb(\gamma 2)=fc(\gamma 2) \tag{1}$$

$$fa(\alpha)=fD1(\alpha), fc(\beta)=fD2(\beta) \tag{2}$$

where fD1(t) and fD2(t) are each continuous functions represented by a demodulation signal of an interval where $t \leq \alpha$, and $t \geq \beta$.

$$fa(t), fb(t), \text{ and } fc(t) \text{ can each be } M\text{-th order differentiated in } [\alpha, \gamma 1], [\gamma 1, \gamma 2], \text{ and } [\gamma 2, \beta]. \tag{3}$$

$$fa^{(M)}(\gamma 1) \neq fb_+^{(M)}(\gamma 1), fb_-^{(M)}(\gamma 2) \neq fc_+^{(M)}(\gamma 2) \tag{4}$$

where $fa^{(M)}(t)$ is a derivative of the M-th order differential of the function f(t), and $f_-^{(M)}(\rho)$ and $f_+^{(M)}(\rho)$ are respectively the left side differential coefficient and the right side differential coefficient in t=ρ.

The above (1) is a condition so that a level discontinuity does not occur at the nodes γ1, γ2 of the respective waveforms of the signal level change portion. The above (2) is a condition such that a level discontinuity does not occur at the starting point α and the end point β of the signal level change portion. Due to the conditions of (1) and (2), the continuity of the signal level of the demodulation signal is ensured. In the above (3), fa(t), fb(t) and fc(t), are continuous functions with no level discontinuity, which means that the derivative up to the M-th order is also continuous. The above (4) means that the derivatives of the M-th order of fa(t), fb(t), and fc(t), are each not continuous at the node. Due to the conditions of (3) and (4), the discontinuity appearing in the M-th order differential of the waveform of the demodulation signal, is produced in the nodes of a plurality of waveforms expressed by different continuous functions.

In order to have only one discontinuity, then γ1=γ2. Furthermore, of the plurality of nodes, it is sufficient if there is a node where there is no level discontinuity in the M-th order differential. In this case, under the conditions of (4), the left side differential coefficient and the right side differential coefficient of the M-th order in this node become equal.

The difference between the function fa(t) (t∈[α, γ1] and the function fb(t) (t∈[γ1, γ2]) is that when fa(t) is expanded as is to [γ1, γ2], this becomes fa(ξ)≠fb(ξ), and ξ∈[γ1, γ2] exists.

Consequently, even in the case where for example the function fb(t) is a function fa(t−τ) where fa(t) is just displaced by τ on the t axis, fa(t) and fb(t) can be treated as functions where the two functions are different when the above conditions are satisfied. Furthermore, when fa(t) and fb(t) are different functions, and fb(t) and fc(t) are different functions, then regardless of the above mentioned conditions, fa(t) and fc(t) are handled as being different functions.

As described above, in radio communication, the occupied bandwidth in the transmission signal is prescribed by the radio wave method, and the frequency band width of the transmission signal is limited. Consequently the frequency band width of the demodulation signal is also limited. When the limiting of the frequency band width is performed by a filter or the like, and an influence is given to the singularity existing in the signal level change portion, there is the possibility of causing a level drop or the like in the singularity detection section. Therefore, it is desirable to configure the demodulation signal (and the modulation signal on the transmission side) so that the frequency band width of the transmission signal satisfies the limit of the radio wave method from the beginning. As a result, a filter for band width limiting is unnecessary. Moreover, it is considered that the high frequency component of the signal mainly originates in the component of the portion where the signal level changes. Consequently, it is desirable to determine the function which gives the waveform of the signal level change portion so as to satisfy the aforementioned conditions (1) to (4), and so that the transmission signal satisfies the occupied bandwidth prescribed by the radio wave method or the like.

Figure 17:
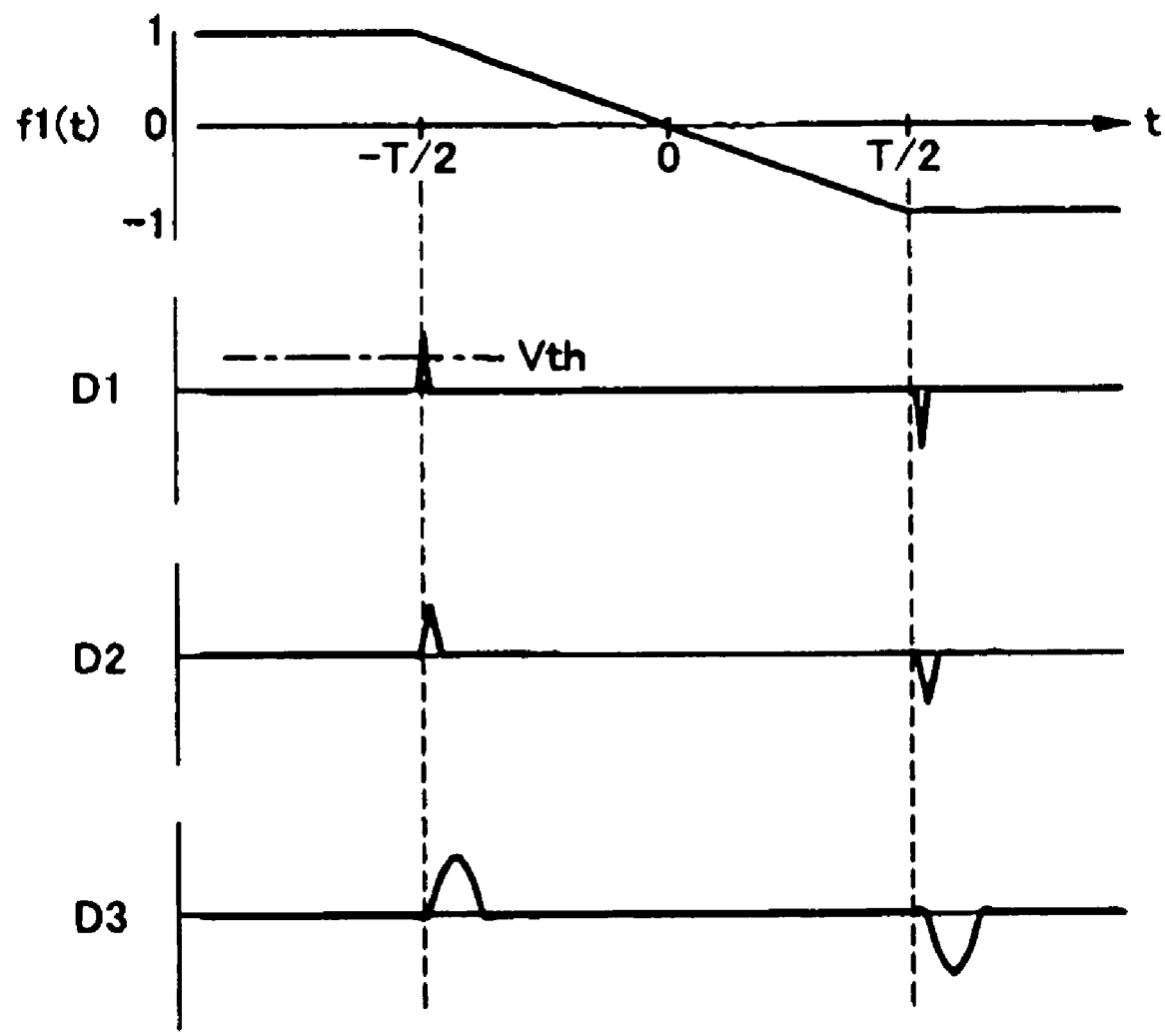
FIG. 17 is a waveform example of a signal level change portion in which a discontinuity appears in a first order differential.
Figure 18:
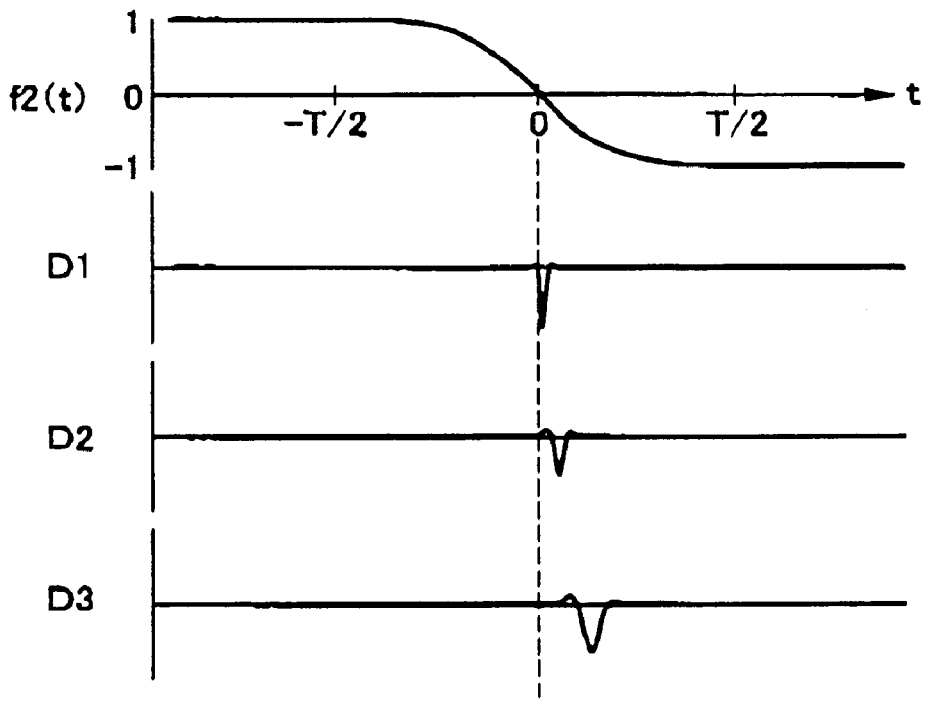
FIG. 18 is a waveform example of a signal level change portion in which a discontinuity appears in a second order differential.
Figure 19:
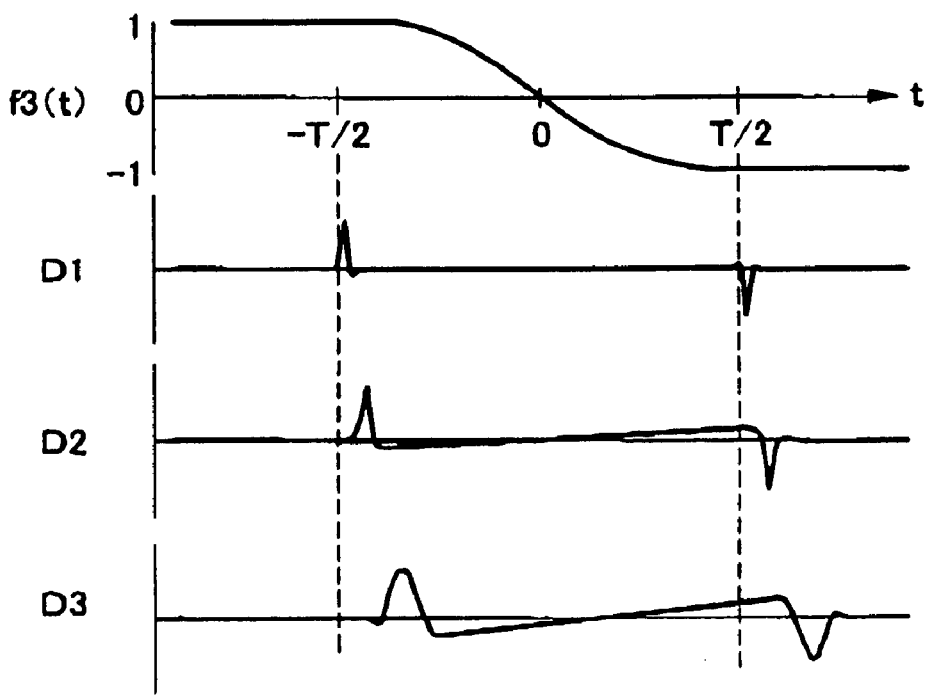
FIG. 19 is a waveform example of a signal level change portion in which a discontinuity appears in a third order differential.

FIG. 17 to FIG. 19 show a specific example of the waveform for M=1, 2, and 3. In each of the figures, outside of the signal level change portion is a definite value of +1 or −1.

FIG. 17 shows a waveform example of the signal level change portion for the case where M=1, that is, where a discontinuity appears in the first order differential of the waveform, and an output example of D1 to D3 of the subband dispersion filter 113B of the singularity detection section 113, for this waveform.

Waveform f1(t) is expressed by the following Expression 3.

$$f_1(t) = \begin{cases} +1 & t \leq -aT/2 \\ -2t/aT & -aT/2 \leq t \leq aT/2 \\ -1 & t \geq aT/2 \end{cases} \quad \text{[Expression 3]}$$

Here "a" is a positive real number (where a=1 in FIG. 17).

In f1(t), t∈[−T/2, T/2] is the signal level change portion. The point for t=±T/2 is configured by a waveform expressed by two functions different to each other. That is, the signal level change portion is configured by connecting a plurality of waveforms expressed by different functions. Furthermore the discontinuity which appears in the first order differential at the point of the node t=±T/2 is detected as a change of the outputs D1 to D3 of the subband dispersion fitter 113B as shown in the figure.

FIG. 18 shows a waveform example of the signal level change portion for the case where M=2, that is, where a discontinuity appears in the second order differential of the waveform, and an output example of D1 to D3 of the subband dispersion filter 113B of the singularity detection section 113, for this waveform.

Waveform f2(*t*) is expressed by the following Expression 4.

$$f_2(t) = \begin{cases} +1 & t \leq -T/2 \\ -\left(\dfrac{2t+T}{T}\right)^p + 1 & -T/2 \leq t \leq 0 \\ \left(\dfrac{-2t+T}{T}\right) - 1 & 0 \leq t \leq T/2 \\ -1 & t \geq T/2 \end{cases} \quad \text{[Expression 4]}$$

Here, "p" is a natural number of two or more (where p=3 in the figure).

In the waveform f2(*t*), t∈[−T/2, T/2] is the signal level change portion.

In order to suppress the occupied bandwidth without using a filter or the like, it is preferable to smoothly connect the signal level change portion of the demodulation signal to portions other than this. More specifically, it is preferable that the value of the first order differential of the waveform of the demodulation signal is continuous at the start point and the end point of the signal level change portion. Furthermore, it is also preferable that the waveform for where the waveform of the signal level change portion is obtained as the first order differential, is one where the signal level is continuous. At p=2 or more where the waveform f2(*t*) can realize such characteristics, the value of the first order differential of f2(*t*) is zero at the start point and the end point of the signal level change portion, and is continuous between the start point and the end point. Furthermore, in the second order differential of f2(*t*) a discontinuity appears at the node t=0 of the waveform which is expressed by two different functions, and as shown in the figure, is detected as a change of the outputs D1 to D3 of the subband dispersion filter 113B. At p=2, other than for t=0 from the second order differential, a discontinuity also occurs at t=±T/2, and if p=3 or more, then as shown in the figure, at t=±T/2 this becomes continuous, and a discontinuity only occurs at t=0.

FIG. 19 shows a waveform example of the signal level change portion for the case where M=3, that is, where a discontinuity appears in the third order differential of the waveform, and an output example of D1 to D3 of the subband dispersion filter 113B of the singularity detection section 113, for this waveform.

Waveform f3(*t*) is expressed by the following Expression 5.

$$f_3(t) = \begin{cases} +1 & t \leq -T/2 \\ -\dfrac{12}{T^5}t^5 + \dfrac{10}{T^3}t^3 - \dfrac{15}{4T}t & -T/2 \leq t \leq T/2 \\ -1 & t \geq T/2 \end{cases} \quad \text{[Expression 5]}$$

In the waveform f3(*t*), similarly to the waveform f2(*t*) of FIG. 18, the value of the first order differential of the waveform of the demodulation signal is continuous at the start point and the end point of the signal level change portion, and the waveform for where the waveform of the signal level change portion is obtained as the first order differential, also satisfies the characteristic that the signal level is continuous. Furthermore, even if the waveform f3(*t*) is a second order differential, it has the same characteristics as the waveform obtained by the first order differential. In the waveform f3(*t*), t∈[−T/2, T/2] is the signal level change portion. Furthermore, as shown in the figure, the discontinuity which appears in the third order differential at the point of the node t=±T/2 is detected as a change of the outputs D1 to D3 of the subband dispersion filter 113B.

In the transmitter 100, the modulation section 103 can use various modulation methods such as amplitude modulation or angle modulation, provided that, as described above, this can transmit a transmission signal which can produce a demodulation signal for which a singularity (a discontinuity which appears in the M-th order differential of the waveform of the demodulation signal) exists locally on the time axis, and the signal level is continuous. Needless to say the demodulation section 112 of the receiver 110 is of a construction which can demodulate a transmission signal from the transmitter 100.

As a configuration example of the modulation section 103 and the demodulation section 112, for example the aforementioned configuration of FIG. 6 or FIG. 7 is considered.

In the case of the present embodiment, the modulation signal fM(t) of FIG. 6 (A) is a signal where the signal level change portion is configured for example by the aforementioned function f1(*t*), f2(*t*), f3(*t*), or the like.

The modulation/demodulation operation by the modulation section 3 and the demodulation section 12 of FIG. 6 in the present embodiment is the same as mentioned before. The frequency detection signal fDM(t) produced by the F/V converter can be expressed as mentioned before by the equation of fDM(t)=D·fM(t) (where D is a constant).

From this equation, fM(t) can be obtained as the demodulation signal. Consequently, the transmitter 100 can transmit a transmission signal which produces a demodulation signal for which a singularity (the discontinuity appearing in the M-th order differential of the waveform of the demodulation signal) exists locally on the time axis, and the signal level is continuous.

Furthermore, in the case where the modulation section 103 and the demodulation section 112 are made the configuration of FIG. 7, then similarly to the above, the modulation signal fMI(t) is made the is input, and the modulation signal fMQ(t) is made the Qs input, and in the orthogonal modulator, the modulation reference signal (frequency fr) from the signal source LO1 is modulated by the is input and the Qs input, and a signal fQM(t) is output. The unnecessary frequency band components of the output signal fQM(t) are removed by the filter, and a transmission signal fSD(t) is transmitted. Here, fMI(t) and fMQ(t) are determined so that fMI(t)$^2$+fMQ(t)$^2$=1 holds, giving the following equation.

*f*MI(*t*)=*f*M(*t*)

*f*MQ(*t*)=sin [ cos$^{-1}$(*f*M(*t*))]

where (|*f*M(*t*)|≦1).

Here fM(t) is a signal the same as the demodulation signal to be originally generated, being a signal where the signal level change portion is configured for example by the aforementioned function f1(*t*), f2(*t*), f3(*t*), or the like.

Furthermore, the filter and fM(t) are determined so that the transmission signal fSD(t) output from the filter become substantially the same as fQM(t). As a result, fSD(t)=fQM(t).

On input to the demodulation section 112 which receives the transmission signal fSD(t), then describing the case for where ω=0 (where fp=fr), the orthogonal demodulator demodulates the reception signal by the demodulation reference signal (frequency fr) from the signal source LO2, and orthogonal demodulation signals fIR(t) and fQR(t) which have an orthogonal relation to each other are output. A filter then removes the unnecessary frequency components, and signals fDI(t) and fDQ(t) are output. Here fDI(t) and fDQ(t) are expressed by the following expression.

$$fDI(t)=E'\cdot\cos[\cos^{-1}(fM(t))+\phi']$$

$$fDQ(t)=E'\cdot\sin[\cos^{-1}(fM(t))+\phi']$$

Here E' is a constant. In the above expression, if the phase difference φ'=0 can be maintained, then;

$$fDI(t)=E'\cdot fM(t)$$

$$fDQ(t)=E'\cdot(1-fM(t)^2)^{1/2}$$

In the case where an orthogonal modulation/demodulation method is adopted in which fM(t) can be obtained as fDI(t), if the configuration is such that the phase difference φ'=0 can be maintained, then fDI(t) can be used as the demodulation signal for singularity detection.

Hereunder is a description of the measuring operation of the seventh embodiment.

In the transmitter 100, in the case of the modulation section 103 of FIG. 6, the modulation signal generating section 102 generates the modulation signal fM(t), and in the case of FIG. 7, generates fMI(t) and fMQ(t), and inputs this to the modulation section 103, and as mentioned before the transmission signal fSD(t) is transmitted from the modulation section 103. Here the modulation signal fM(t) or fMI(t) is a signal where the signal level change portion is constituted by the aforementioned function f1(t), f2(t), f3(t) or the like, as shown in FIG. 17 to FIG. 19, and the transmission signal fSD(t) is one where the frequency band width satisfies the regulation of the occupied bandwidth of the radio wave method or the like.

In the receiver 110, the transmission signal fSD(t) is received and input to the reception time determining apparatus 111. In the reception time determining apparatus 111, the reception signal is input to the demodulation section 112, and as mentioned before, the demodulation section 112, in the case of FIG. 6, outputs the demodulation signal fDM(t) (=fM(t)), and in the case of FIG. 7, outputs fDI(t) (=fM(t): where the phase difference φ'=0 is maintained) as the demodulation signal. The demodulation signal fDM(t) or fDI(t) is input to the singularity detection section 113 of the configuration shown in FIG. 16, and the output Di is output as a singularity detection signal. Here in the case where the signal level change portion of the demodulation signal is constituted for example by the function f1(t) where the discontinuity appears in the first order differential, the output D1 of FIG. 17 is output as the singularity detection signal. In the case where this is constituted by the function f2(t) where the discontinuity appears in the second order differential, the output D1 of FIG. 18 is output as the singularity detection signal. In the case where this is constituted by the function f3(t) where the discontinuity appears in the third order differential, the output D1 of FIG. 19 is output as the singularity detection signal.

The singularity detection signal D1 from the band pass filter 13 is input to the level comparator 14A of the time measurement section 14, and compared with a previously set threshold Vth, and if the signal level of the singularity detection signal D1 is greater than or equal to the threshold Vth, a signal of logic value 1 is input from the level comparator 14A to the reception time computing section 14C. Time information from the timing section 14B is input one by one to the reception time computing section 14C, and the reception time computing section 14C reports the time for when a signal of logic value 1 is input from the level comparator 14A, as the reception time of the reception signal. In the case where, as in FIG. 18, the singularity detection signal D1 is a negative value, an absolute value circuit 14D as shown by the dotted line in FIG. 3, may be provided, and this then input to the level comparator 14A.

According to such a construction, by using a signal where the signal level is continuous, the reception time for the reception signal can be detected with high accuracy without expanding the occupied bandwidth of the radio signal. Consequently, limited frequency resources can be effectively utilized. Moreover this can be concluded without lowering the information transmission speed, and hence the practical effect is great.

In the configuration of the seventh embodiment shown in FIG. 15, in the case where noise is mixed with the reception signal, this interferes with the detection of the singularity contained in the demodulation signal, so that there is concern that the noise will be mistakenly detected as the singularity, inviting a deterioration in the time measurement accuracy.

In order to prevent erroneous measurement due to noise, the configuration may be such that for example the correlation computing section 20 of FIG. 8 serving as an erroneous measurement prevention section, is provided between the singularity detection section 113 and the time measurement section 114 of FIG. 15. In this case, the A/D converter 24 is unnecessary, and the singularity detection signal from the singularity detection section 113 is input directly to the delay circuit 21.

The operation of the correlation computing section 20 for this case is described with reference to FIG. 20.

Figure 20:
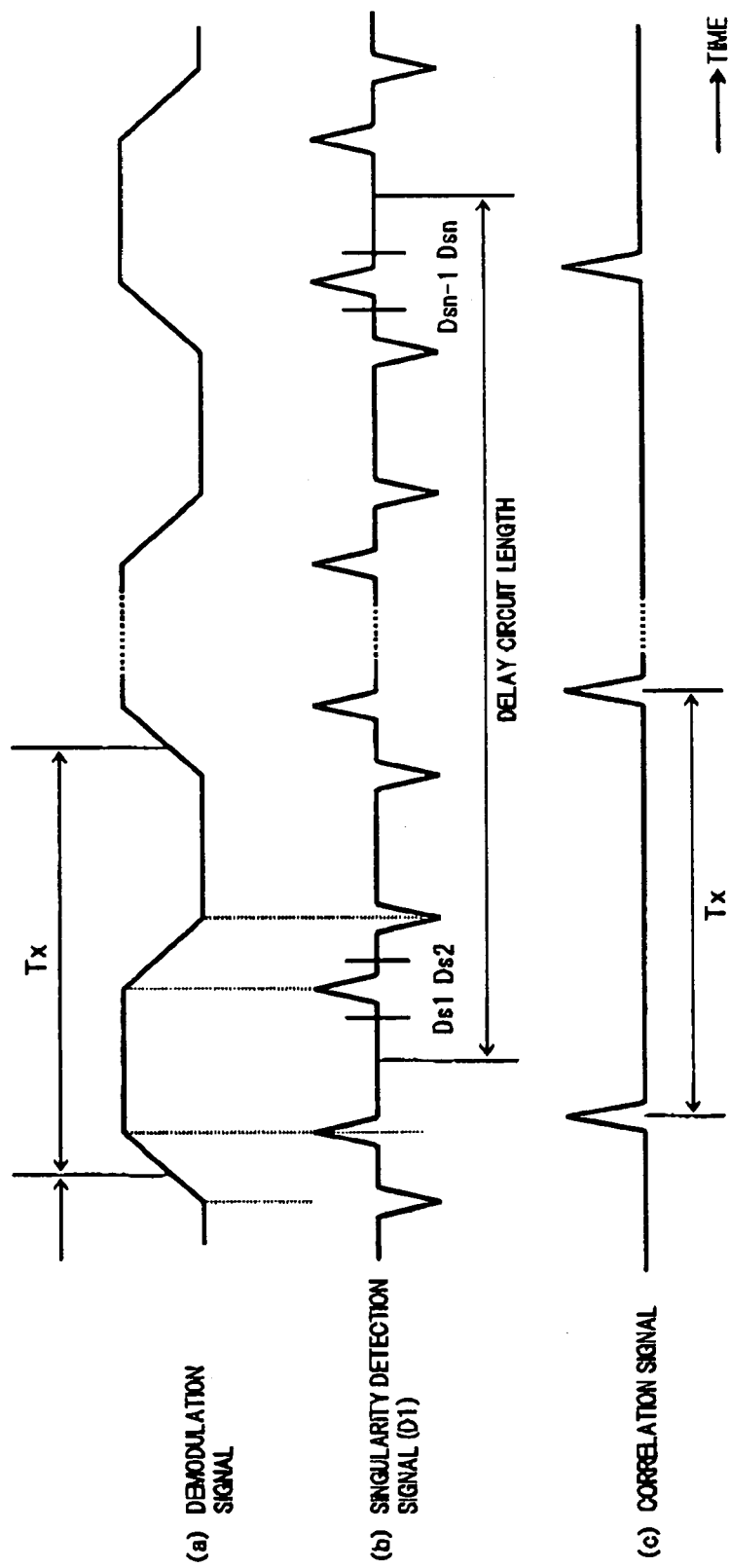
FIG. 20 is a diagram for explaining the operation of a correlation computing section in the case of time measurement at a singularity.

For example, the demodulation signal is one which contains a signal level change portion constituted by the waveform (refer to FIG. 17) in which a discontinuity is produced in the first order differential as in (a) of FIG. 20, and is configured by repeating the same signal level change portion with the Tx in the figure as a unit. In this case, a singularity detection signal D1 as in (b) of FIG. 20 is output from the singularity detection section 113. The singularity detection signal D1 is propagated in the delay circuit 21 while being delayed by the respective delay elements D, and during propagation the coefficient 1 to coefficient n are affixed to the outputs Ds1 to Dsn of the respective delay elements D, by the multipliers 22-1 to 22-n (in FIG. 20, Ds1 to Dsn are shown with coarser spacing than in actuality). The multiplication result is added by the adder 23, and output as a correlation signal. The coefficient 1 to coefficient n are determined from a correlation reference signal which realizes a correlation calculation for the input signal and the correlation reference signal, so that a correlation signal of a high level is generated from the adder 23 when the output pattern of the outputs Ds1 to Dsn of the delay circuit 21 is a generation pattern for the singularity detection signal which should originally be generated. Here the correlation reference signal is determined so as to regard the singularity detection signal which should be originally generated as a signal with high similarity. As a result, if the singularity detection signal D1 is input to the delay circuit 21, and the output pattern of the delay circuit 21 is a generation pattern of a singularity detection signal which should originally be generated, then a correlation signal of a high level is generated from the adder 23. Thereafter, provided that the original generation pattern continues, a correlation signal of a high level greater than or equal to the threshold Vth in the time measurement section 14 is generated from the adder 23, in the period Tx as shown in (c) of FIG. 20. For example, if due to noise mixing, the generation pattern of the singularity detection signal D1 is different from the original pattern, then the correlation signal level from the adder 23 is lower than the threshold Vth. As a result, if a noise is present, an output of logic value 1 from the level comparator 14A is not generated, and the reception time is not reported, so that the erroneous measurement due to noise can be prevented.

Moreover, in order to prevent erroneous measurement due to noise, then instead of the correlation computing section 20 of FIG. 8, for example the configuration may be such that a noise suppressing section 30 of the configuration of FIG. 9 is provided as the erroneous measurement prevention section between the demodulation section 112 and the singularity detection section 113. In this case, the input signal of FIG. 9 becomes the demodulation signal. The operation of the noise suppressing section 30 of FIG. 9 is the same as described above, and hence description is omitted.

The noise suppressing section 30, as with the case where the band pass filter is used, may be provided between the singularity detection section 113 and the time measurement section 114, and the correlation computing section 20 of FIG. 20 and the noise suppressing section 30 of FIG. 9 may be combined. There may be considered a configuration where, the noise suppressing section 30 is provided between the demodulation section 112 and the singularity detection section 113, and the correlation computing section 20 is provided between the singularity detection section 113 and the time measurement section 114, or the noise suppressing section 30 and the correlation computing section 20 are provided in sequence from the singularity detection section 113, between the singularity detection section 113 and the time measurement section 114.

Furthermore, in the case where the orthogonal demodulation circuit of (B) of FIG. 7 is used in the demodulator section 112, then by adopting the configuration of FIG. 10, the influence of the phase difference $\phi'$ can be removed without adopting the complicated phase holding configuration.

In this case, in FIG. 10, the band pass filter 43 is replaced by the singularity detection section, and the singularity detection section comprises a first detection section for detecting a singularity contained in the demodulation signal I and outputting a singularity detection signal I, and a second detection section for detecting a singularity contained in the demodulation signal Q and outputting a singularity detection signal Q. The first detection section and the second detection section have the same configuration as in FIG. 16. Furthermore, the singularity detection signal I is a first signal change portion detection signal corresponding to the filter output signal I of FIG. 10, and the singularity detection signal Q is a second signal change portion detection signal corresponding to the filter output signal Q of FIG. 10.

In such a configuration, for the demodulation signals I and Q the following is output:

$$I = fDI(t) = E' \cdot \cos[\cos^{-1}(fM(t)) + \phi']$$

$$Q = fDQ(t) = E' \cdot \sin[\cos^{-1}(fM(t)) + \phi']$$

Information of the singularity is contained in each of the demodulation signals I and Q, and from the first and second detection sections of the singularity detection section, for example output D1 is respectively output as the singularity detection signals I and Q as mentioned before, and respective addition signals are output as correlation signals I and Q as mentioned before from the first and second calculation sections 45A and 45B of the correlation computing section 45. The correlation signals I and Q are subjected to squaring calculation in the multipliers 46A and 46B of the square sum calculating section 46, and the square sum signal added in the adder 46C is compared with the threshold Vth in the level comparator 14A, and the reception time is measured in the reception time computing section 14C.

According to such a construction, by the square sum calculation in the square sum calculating section 46, the influence of the phase difference $\phi'$ can be eliminated. Furthermore, by providing the correlation computing section 45, the influence of noise can be suppressed. Consequently, the reception time can be measured at high accuracy.

Furthermore, for the demodulation signal, the PN code can be used. Since the PN code has several change points for the data value, this may be a demodulation signal in which part or all of the change points are constituted as the aforementioned signal level change portion.

In the case where the demodulation signal is constituted by the PN code, then the configuration may be as in FIG. 12. In this case, the band pass filter 53 of FIG. 12 may be replaced by the singularity detection section of the configuration of FIG. 16, and made a singularity detection section 53. The other configuration remains the same.

The operation is the same as for the case where the band pass filter is used, and will be briefly described.

Figure 21:
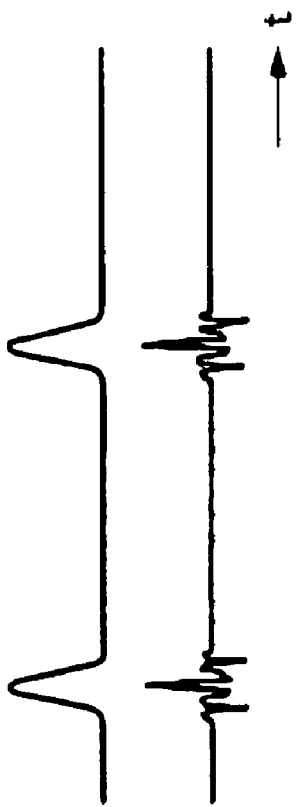
FIG. 21 is a diagram showing a relationship on a time axis of a correlation signal for an inverse diffusion signal for the case of time measurement at a singularity.

The demodulation signal from the demodulation section 52 is respectively input to the inverse diffusion processing section 55 and the singularity detection section 53. The inverse diffusion processing section 55 digitizes the demodulation signal constituted by the PN code in an A/D converter, and this digitized demodulation signal is inverse diffusion processed in a digital matched filter, and an inverse diffused signal of the waveform as shown in (a) of FIG. 21 is output. The second time measurement section 56 measures the time where the inverse diffused signal becomes greater than or equal to a predetermined threshold, and inputs this as a reference reception time to the measurement value determining section 57.

On the other hand, the output D1 from the singularity detection section 53 is generated as a singularity detection signal, and input to the first time measurement section 54. In the first time measurement section 54, a correlation computation is executed for the singularity detection signal and the reference correlation signal, by means of the correlation computing section 20, and a correlation signal of the waveform shown in (b) of FIG. 21 is generated. This correlation signal level and a threshold are compared in the level comparator 14A, and the time for when the correlation signal level becomes greater than or equal to a predetermined threshold is output to the measurement value determining section 57 as the reception time. The measurement value determining section 57 determines if the reception time of the first time measurement section 54 is normal or abnormal based on the reference reception time input from the second time measurement section 56.

Furthermore, before and after one chip width of the PN code with the reference reception time as the center, is determined as the reception time existence range. When the reception time of the first time measurement section 54 is within the reception time existence range, the reception time is judged to be a correct value, and normal is reported, while when outside of the reception time existence range, the reception time is judged to be an incorrect value, and abnormal is reported. As a result, the accuracy of the reception time measurement is not worsened more than the measurement accuracy of the reference reception time. Furthermore, worsening of the measurement accuracy of the reception time due to noise increase can be detected, and hence the reliability of the reception time determining apparatus is improved.

In the case where the demodulation section is the orthogonal demodulation circuit of FIG. 7 (B), if inverse diffusion processing sections for inverse diffusion processing each of the demodulation signals I and Q, and a square sum computing section for square sum calculating the inverse diffusion signals respectively output from the inverse diffusion processing sections are provided, and the square sum signal from the square sum calculating section is input to the second time measurement section 56, and the reference reception time is measured, the influence of the phase difference $\phi'$ on the reference reception time can be eliminated.

Figure 22:
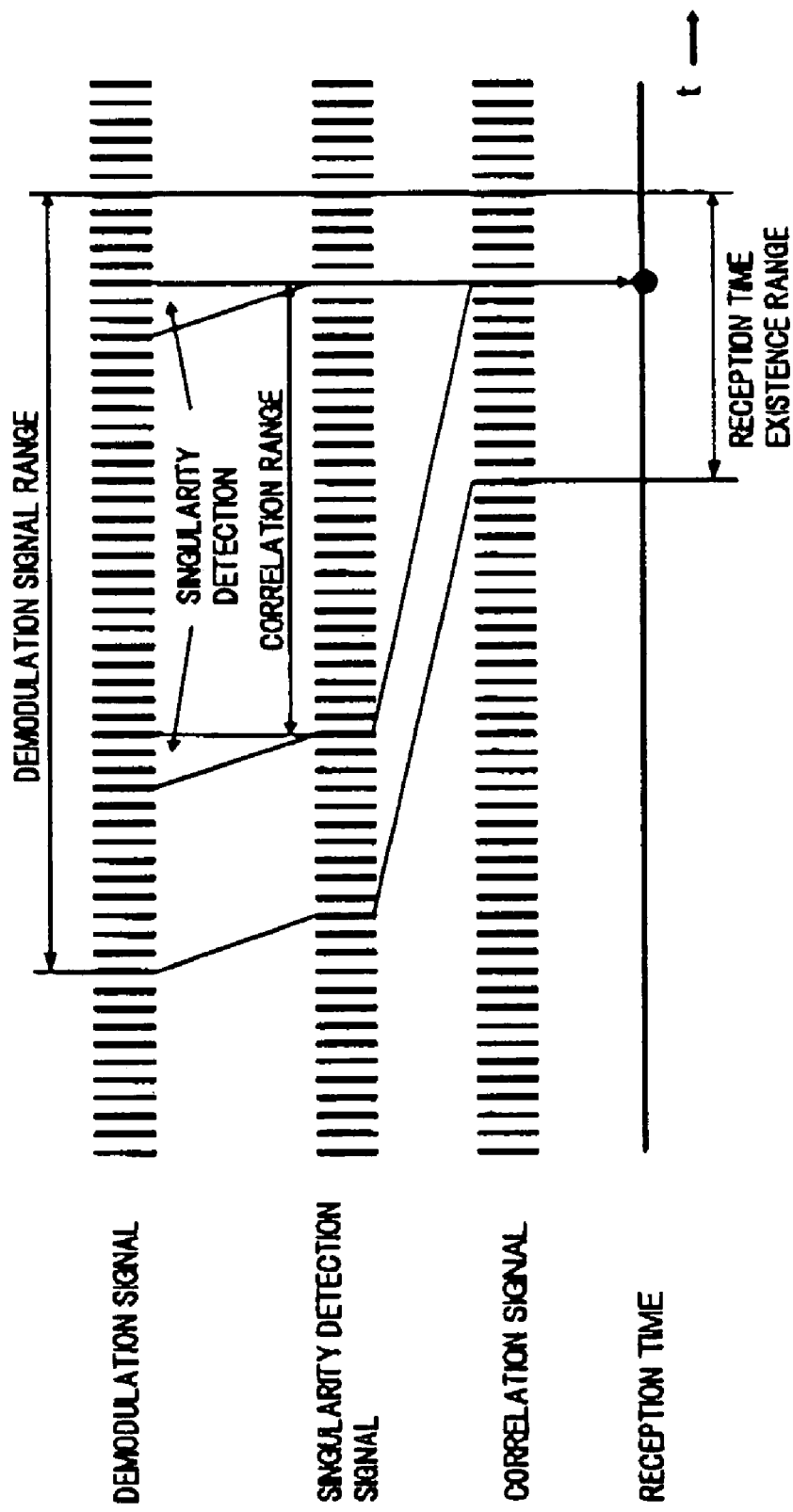
FIG. 22 is a diagram schematically showing a relationship of a signal data range used for reception time measurement.

As mentioned above, there is a constant relationship between the reception time obtained from the first time measurement section 54, and the reference reception time obtained from the second time measurement section 56, and the reception time existence range can be determined from the reference reception time. The reference reception time has a one to one relationship on the time axis with the correlation signal, and the correlation signal has a one to one relationship on the time axis with the singularity detection signal of the correlation range, and the singularity detection signal has a one to one relationship on the time axis with the demodulation signal of the predetermined range. FIG. 22 schematically shows the range of the signal data which is respectively used based on the aforementioned correlation, for the correlation computation for the singularity detection processing for obtaining the reception time. As shown in the figure, the demodulation signal range can be determined with respect to the reception time existence range. Consequently, by performing measurement processing of the reception time only for the demodulation signal within the demodulation signal range in FIG. 22, the measurement processing for the reception time can be reduced.

Figure 23:
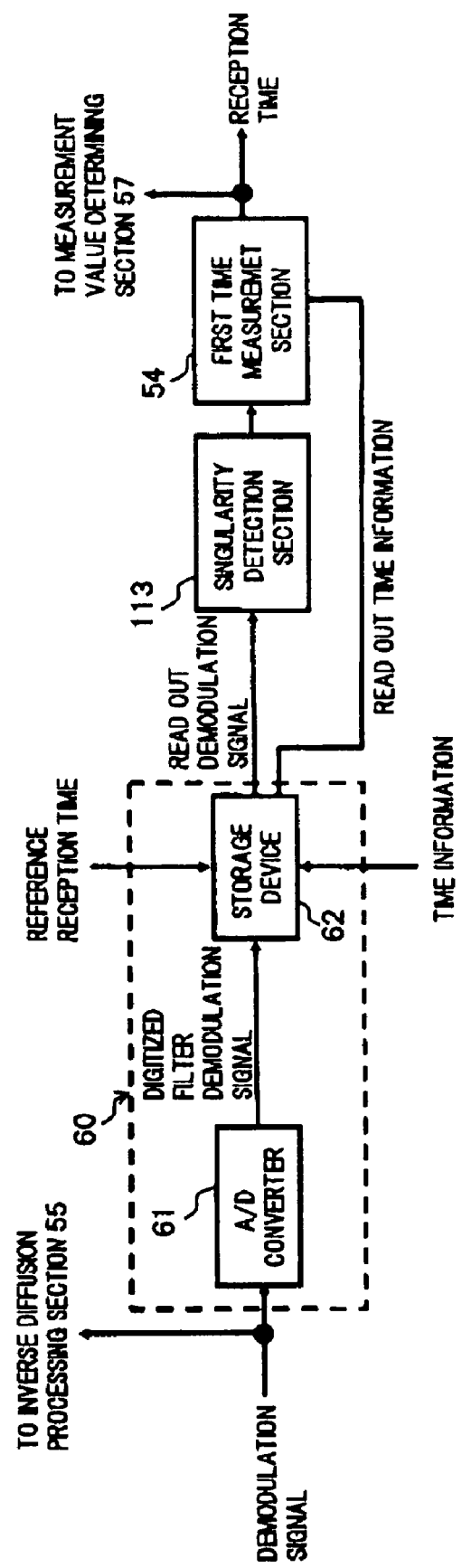
FIG. 23 is a block diagram for time measurement processing reduction in the case of time measurement at a singularity.

In the configuration for reducing the measurement processing of the reception time, for example as shown in FIG. 23, the signal storage section 60 of FIG. 13 is arranged between the demodulation section 112 and the singularity detection section 113.

In the signal storage section 60, the demodulated signal is converted to a digitized demodulated signal in the A/D converter 61, and the digitized demodulated signal is associated with the time information and stored in the storage device 62. Furthermore, the storage device 62 determines the demodulation signal range for use in subsequent processing, based on an input reference reception time.

The operation of the reception time measuring apparatus of such a construction will be described.

When a demodulation signal is input to the signal storage section 60, this is converted to a digitized demodulation signal in the A/D converter 61, and sequentially input to the storage device 62. The storage device 62 associates the digitized demodulation signal with time information for each input, and stores this. When a reference reception time is input from the second time measurement section 56, a demodulation signal range based on the reference reception time is determined, and a signal from amongst the stored digitized demodulation signals which corresponds to the demodulation signal range is sequentially output to the singularity detection section 113 as a read out demodulation signal according to the input sequence, and the associated stored time information is sequentially output to the first time measurement section 54 as read out time information. In the singularity detection section 113, a singularity detection signal based on the input digitized demodulation signal is output to the first time measurement section 54. The first time measurement section 54 measures the reception time from the correlation signal and the read out time information, based on the singularity detection signal.

With such a construction, since signal processing need only be for a predetermined range of the demodulation signal, the signal processing for the reception time measurement can be reduced.

In the configuration of FIG. 23, the A/D converter of the singularity detection section 113 in FIG. 16 is unnecessary. Furthermore, the signal storage section 60 may be provided after the singularity detection section 113 so as to determine and store the singularity detection signal range. In this case, when the singularity detection section 113 is of the configuration of FIG. 16, the A/D converter of the signal storage section 60 is unnecessary.

For the singularity detection section 113 which detects the discontinuity which appears in the M-th order differential of the waveform of the demodulation signal, a wavelet transform unit having vanishing moments can be used.

The relationship between the number of vanishing moments in this type of wavelet transform unit, and the detectable differential discontinuities is as in FIG. 24. In FIG. 24, V.M. shows the number of vanishing moments, and O shows detectable, and x shows nondetectable. That is, a wavelet transform unit which has k V.M. (vanishing moments) can detect differential discontinuities up to the (k-1)-th order. Consequently for the singularity detection section 113 which detects for example, the second order differential discontinuity from the demodulation signal including the second order differential discontinuity as a singularity, a wavelet transform unit of V.M.=3 can be used.

Incidentally, the noise mixed with the demodulation signal includes a discontinuity (0-th order differential discontinuity) and a first order differential discontinuity. In this case, since the wavelet transform unit of V.M.=3 also detects the discontinuity (0-th order differential discontinuity) and the first order differential discontinuity as shown in FIG. 24, then in the case where the second order differential discontinuity of the demodulation signal and the noise discontinuity (0-th order differential discontinuity) or the first order differential discontinuity are overlapped, the detection of the second order differential discontinuity of the demodulation signal, that is, detection of the singularity becomes difficult.

Figure 25:
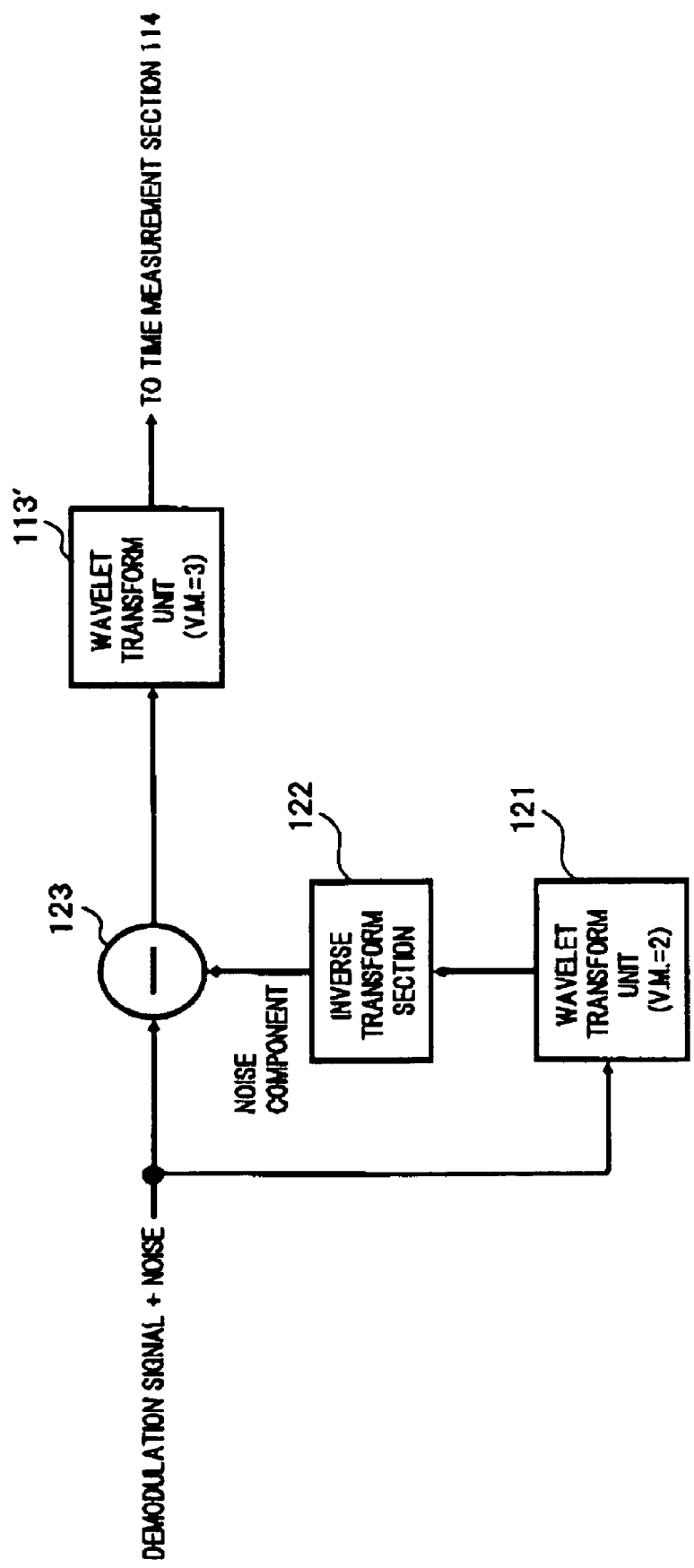
FIG. 25 is a diagram showing a configuration example for eliminating the influence of noise using a wavelet transform unit which has a vanishing moment.

FIG. 25 shows a configuration example which can eliminate the influence of noise, and reliably detect the singularity (the differential discontinuity of the demodulation signal) in the case where a wavelet transform unit having a vanishing moment is used as the singularity detection section. FIG. 25 shows an example of the case where the demodulation signal includes a second order differential discontinuity as the singularity.

In FIG. 25, the wavelet transform unit 113' which has three vanishing moments (V.M) is provided as the singularity detection section 113 of FIG. 15, and before this wavelet transform unit 113', is provided a wavelet transform unit 121 having two vanishing moments (V.M), an inverse transform section 122 which performs wavelet inverse transform, and a subtracter 123.

In this configuration, the demodulation signal is respectively input to the wavelet transform unit 121 and the subtracter 123. The wavelet transform unit 121 detects the discontinuity (0-th order differential discontinuity) contained in the noise, and the first order differential discontinuity. This detection signal is wavelet inverse transformed in the 122, and the noise component extracted, and then input to the subtracter 123. As a result, a demodulation signal containing a second order differential discontinuity for which the noise component has been eliminated is input from the subtracter 123 to the wavelet transform unit 113' which has three vanishing moments (V.M.). Therefore the second order differential discontinuity contained in the demodulation signal can be detected by the wavelet transform unit 113'. Consequently, the influence of noise can be eliminated, and the S/N ratio improved, and erroneous measurement due to noise can be prevented.

In FIG. 25, the configuration example is shown for the case where the demodulation signal includes the second order differential discontinuity as the singularity, however the configuration is not limited to this. When the singularity of the demodulation signal is an M ($M \geq 1$)-th order differential discontinuity, a wavelet transform unit having (M+1) vanishing moments (V.M.) can be used as the singularity detection section 113', and one having M vanishing moments (V.M.) can be used for the wavelet transform unit 121.

Figure 26:
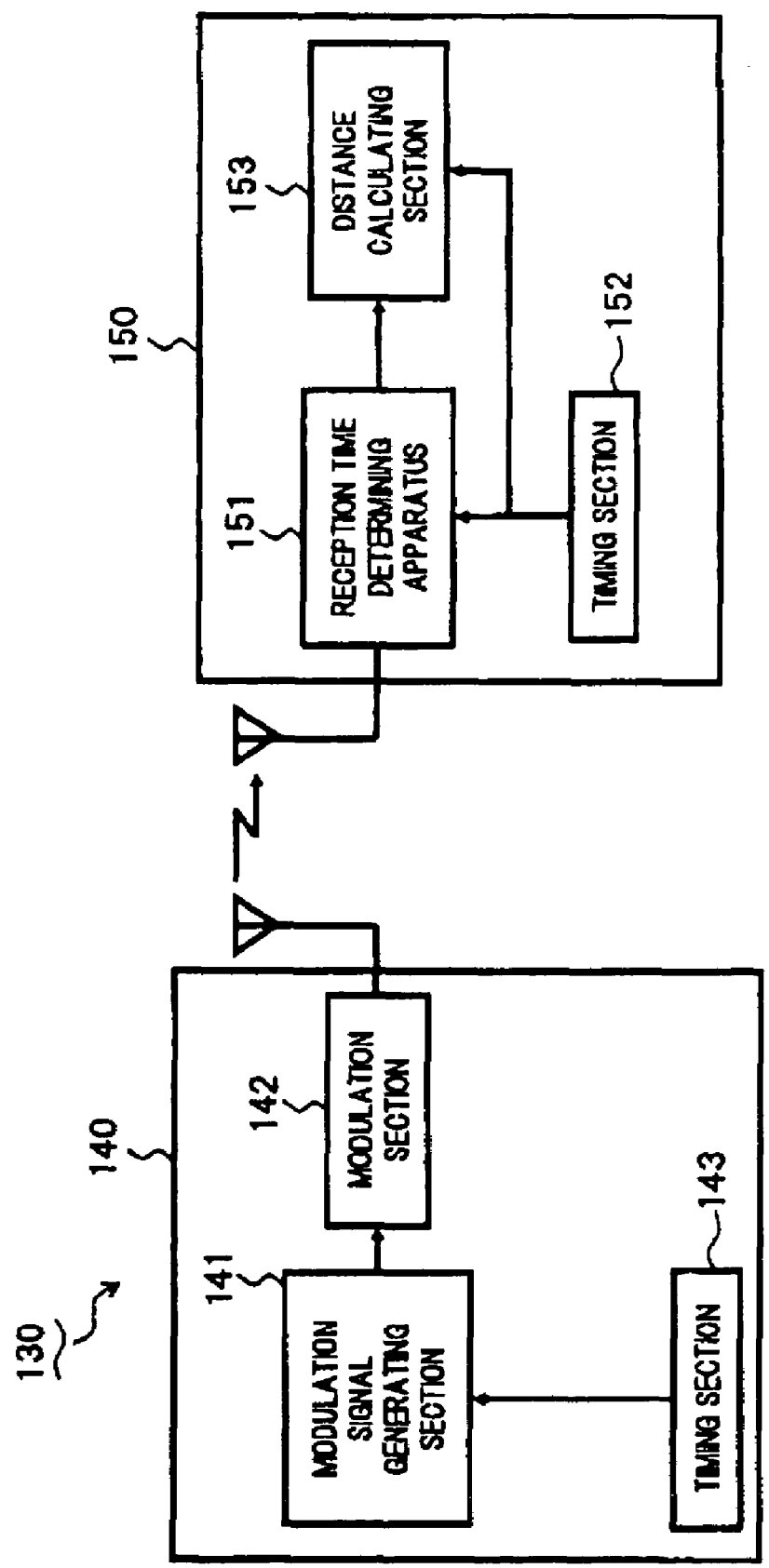
FIG. 26 is a block diagram showing a first embodiment of a distance measuring apparatus of the present invention.

Next the configuration of one embodiment of a distance measuring apparatus according to the present invention to which the above described reception time measuring apparatus of the invention is applied, is shown in FIG. 26.

In FIG. 26, the distance measuring apparatus 130 of this embodiment comprises a transmitter 140, and a receiver 150.

The transmitter 140 comprises: a modulation signal generating section 141, a modulation section 142, and a timing section 143 serving as a measurement section on the transmitter side. The modulation signal generating section 141 and the modulation section 142 are of the same construction as for the previously mentioned case of the reception time determining apparatus. The timing section 143 is one which is synchronized with a timing section 152 on the receiver 150 side with sufficient accuracy.

The receiver 150 comprises the aforementioned reception time determining apparatus 151 of the present invention, the timing section 152 serving as the timing section on the receiver side, and a distance calculating section 153. The distance calculating section 153 calculates the distance between the transmitter 140 and the receiver 150, from the reception time information from the reception time determining apparatus 151, and the time information from the timing section 152.

Next is a description of the distance measuring operation of the distance measuring apparatus of the embodiment.

The transmitter 140 generates a modulation signal in the modulation signal generating section 141 for each reception time previously determined based on the time information of the timing section 143, and outputs a transmission signal. In the receiver 150 which receives the transmission signal, the reception time is calculated in the reception time determining apparatus 151, and the calculation result is reported to the distance calculating section 153. The distance calculating section 153 obtains previously determined transmission time information based on the time information of the timing section 152 which is mutually synchronized with the timing section 143 on the transmission side. As a result, the distance calculating section 153 calculates the distance from an arithmetic expression of (distance)=(propagation speed of radio wave)×((reception time)−(transmission time)).

In the distance calculating section 153, so that the reception time and the transmission time can be associated, the transmission time is preferably set with a sufficient interval from the time computed by (measurement estimate maximum distance)/(propagation speed of radio wave).

INDUSTRIAL APPLICABILITY

The present invention can measure reception time with high accuracy without sacrificing transmission speed, and without expanding the occupied bandwidth in radio communication, and hence industrial applicability is great.

The invention claimed is:

1. A reception time determining apparatus which measures the reception time of a transmission signal from a transmitter, wherein said transmission signal is a signal which produces a demodulation signal in which a signal change portion is unevenly distributed on a time axis and the waveform thereof is continuous on the time axis, said apparatus comprising:

a demodulation section which demodulates a reception signal and outputs said demodulation signal;

a signal change portion detection section which detects said signal change portion contained in said demodulation signal which is output from said demodulation section, and outputs a signal change portion detection signal; and a first time measurement section which measures a reception time of said reception signal based on said signal change portion detection signal output from said signal change portion detection section, wherein said signal change portion detection section comprises a band pass filter configured to pass at least one portion of frequency components contained in said signal change portion and to inhibit frequency components comprising a main lobe of the power spectrum of said demodulation signal, and wherein said first time measurement section measures said reception time based on an output signal of said band pass filter.

2. A reception time determining apparatus according to claim 1, wherein said signal change portion is a portion in which at least one of; a voltage level, a frequency, and a phase, of said demodulation signal changes on the time axis.

3. A reception time determining apparatus according to claim 1, wherein said band pass filter is constructed such that a low pass filter and a high pass filter are connected in cascade, and a cut off frequency of said low pass filter is made a high pass side cut off frequency of the band pass filter, and a cut off frequency of said high pass filter is made a low pass side cut off frequency of the band pass filter.

4. A distance measuring apparatus which measures a distance between a transmitter and a receiver, wherein said transmitter comprises a transmitter side timing section which are in synchronism with a receiver side timing section, and sends a transmission signal at a previously determined sending time, based on time information of said transmitter side timing section, and said receiver comprises: a reception time determining apparatus according to claim 1, said receiver side timing section, and a distance calculating section which calculates a distance between the transmitter and the receiver, from transmission time information obtained from timing information of said receiver side timing section, and a reception time measured by said reception time determining apparatus.

5. A reception time determining apparatus which measures the reception time of a transmission signal from a transmitter, wherein said transmission signal is a signal which produces a demodulation signal for which a singularity exists locally on a time axis, and in which the signal level of the demodulation signal is continuous, said apparatus comprising:

a demodulation section which demodulates a reception signal and outputs said demodulation signal;

a singularity detection section which detects said singularity contained in said demodulation signal which is output from said demodulation section and outputs a singularity detection signal; and a first time measurement section which measures a reception time of said reception signal based on said singularity detection signal output from said singularity detection section, wherein said singularity is a discontinuity appearing in an M-th order differential of a waveform of said demodulation signal in which M is a natural number.

6. A reception time determining apparatus according to claim 5, wherein said demodulation signal is configured to have a continuous signal level by connecting a plurality of waveforms expressed by different continuous functions, and said singularity exists in at least one node of said plurality of waveforms.

7. A reception time determining apparatus according to claim 5, wherein said singularity detection section is constructed so as to generate said singularity detection signal by performing a wavelet transformation to detect a discontinuity appearing in the M-th order differential of a waveform of said demodulation signal.

8. A reception time determining apparatus according to claim 5, wherein said singularity detection section generates said singularity detection signal by a first wavelet transform unit M+1 or more vanishing moments.

9. A reception time determining apparatus according to claim 8, further comprising a noise component removal section comprising:

a second wavelet transform unit having vanishing moments of less than M, said second wavelet transform unit inputting therein said demodulation signal and performing wavelet transformation on said demodulation signal;

an inverse transform section which inputs therein an output signal from said second wavelet transform unit and performs wavelet inverse transformation on said output signal; and a subtractor which performs subtraction on an output signal from said inverse transform section and said demodulation signal, wherein an output signal from said subtractor is input to said singularity detection section.

10. A distance measuring apparatus which measures a distance between a transmitter and a receiver, wherein said transmitter comprises a transmitter side timing section which are in synchronism with a receiver side timing section, and sends a transmission signal at a previously determined sending time, based on time information of said transmitter side timing section, and said receiver comprises: a reception time determining apparatus according to claim 6, said receiver side timing section, and a distance calculating section which calculates a distance between the transmitter and the receiver, from transmission time information obtained from timing information of said receiver side timing section, and a reception time measured by said reception time determining apparatus.

* * * * *